June 28, 1938. C. J. ROHLAND 2,121,986
METHOD FOR MAKING HAIR WAVING PADS
Filed Aug. 22, 1935 16 Sheets-Sheet 5
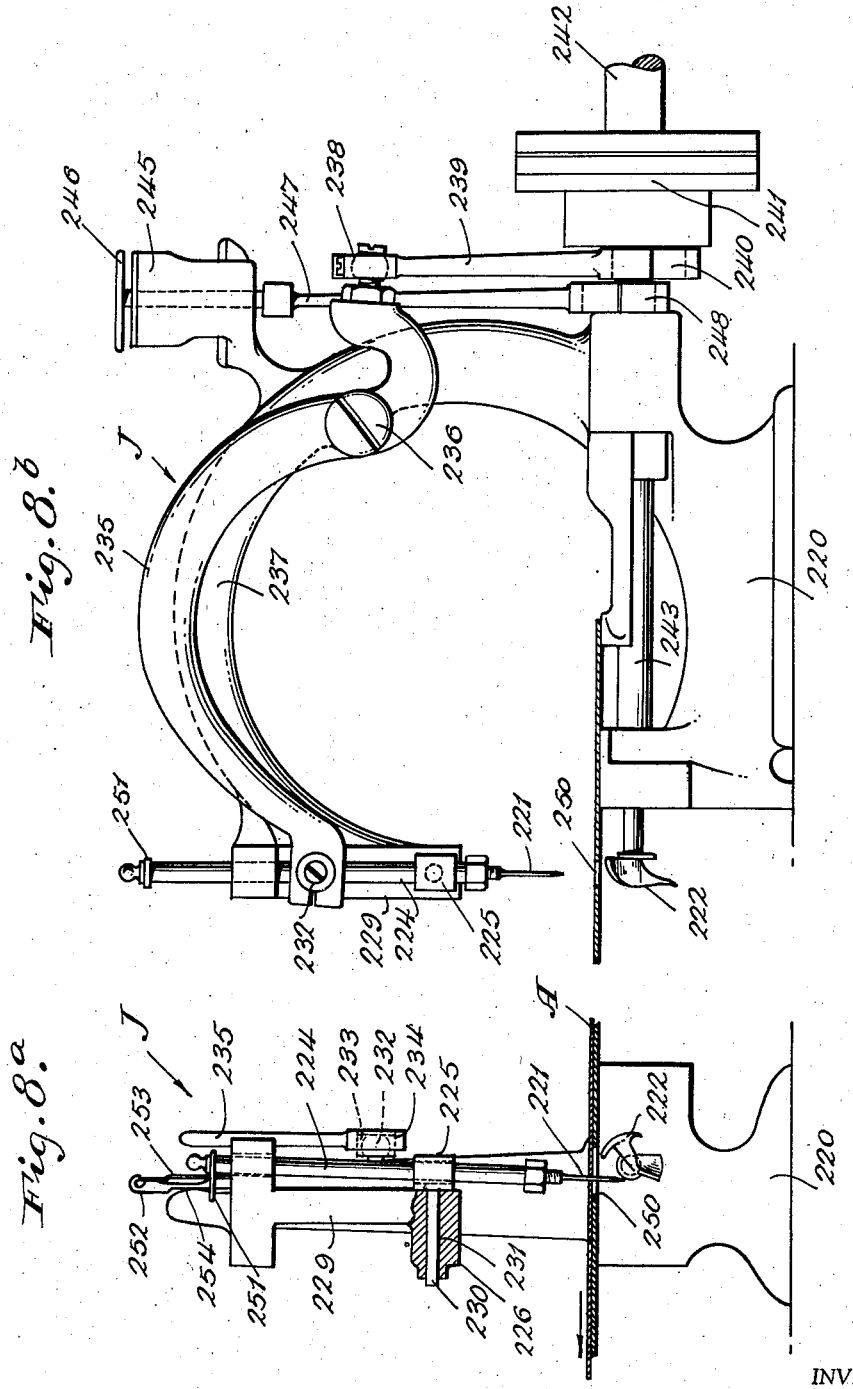
INVENTOR.
CURT J. ROHLAND
BY
Richards & Geier
ATTORNEYS June 28, 1938.  C. J. ROHLAND  2,121,986
METHOD FOR MAKING HAIR WAVING PADS
Filed Aug. 22, 1935  16 Sheets-Sheet 6
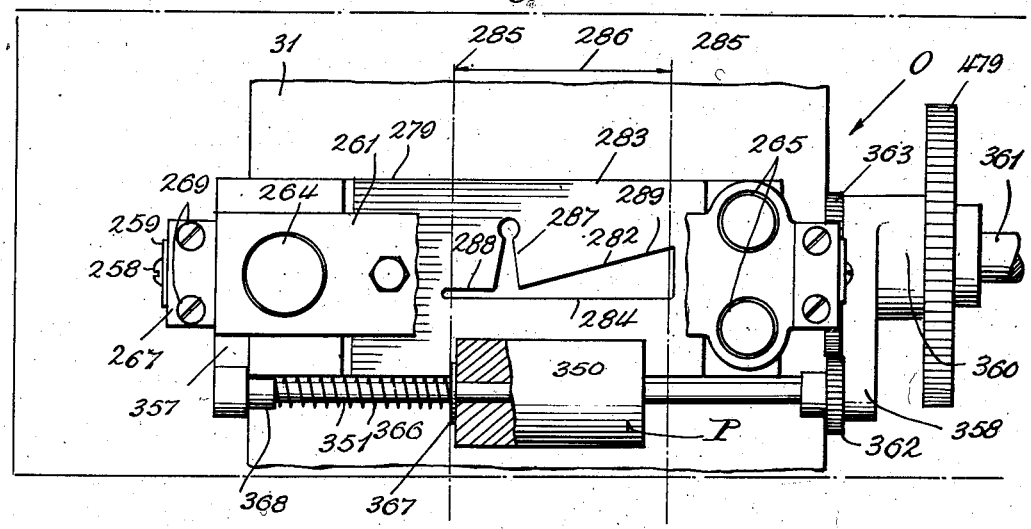
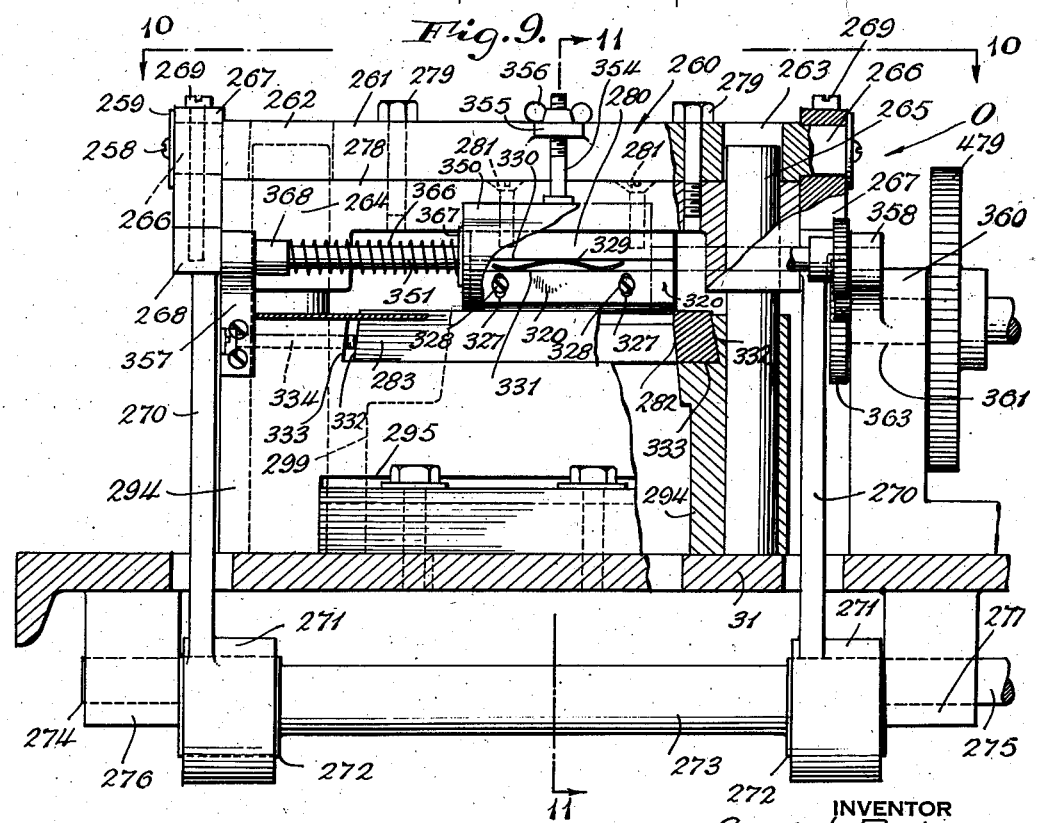

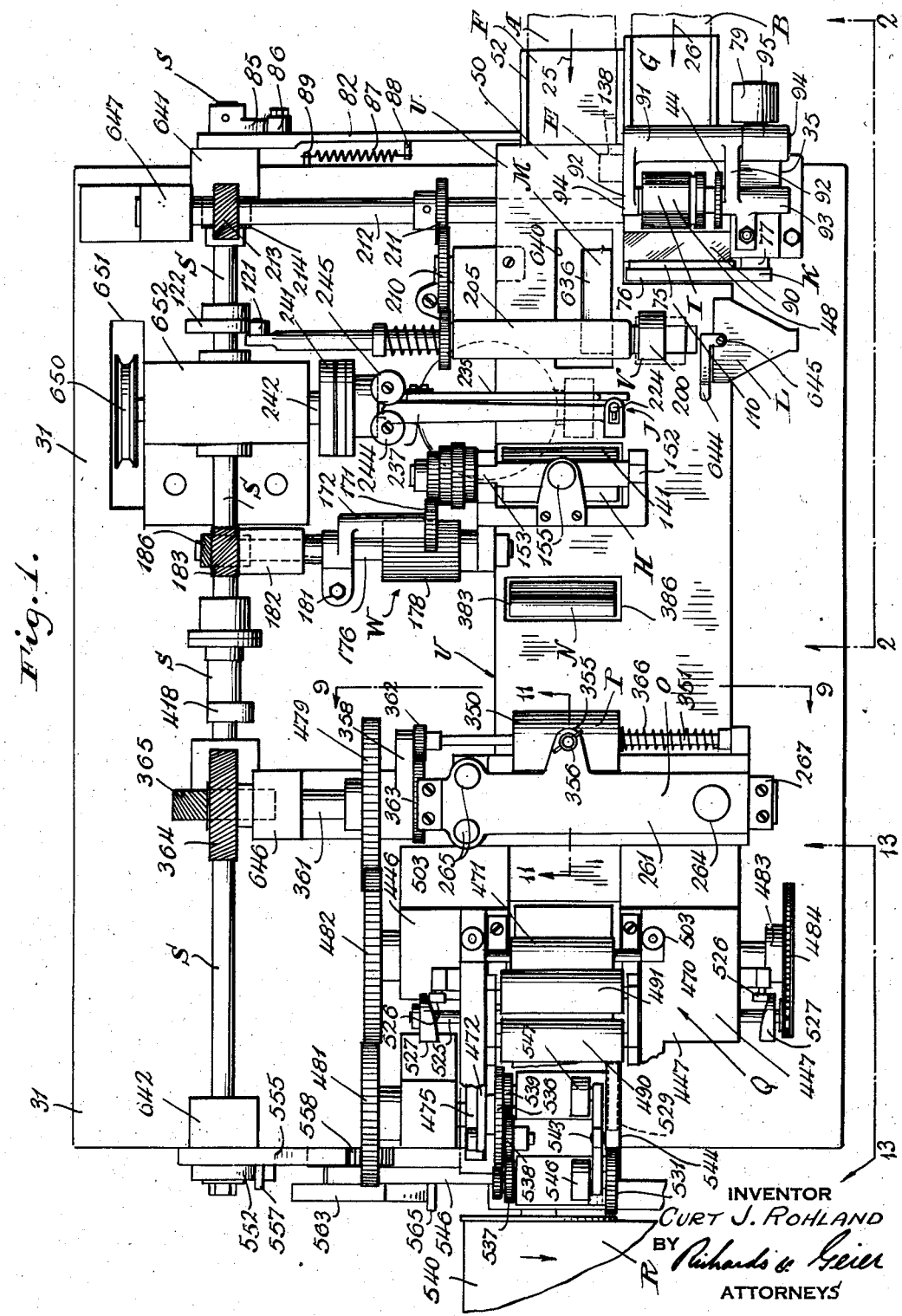

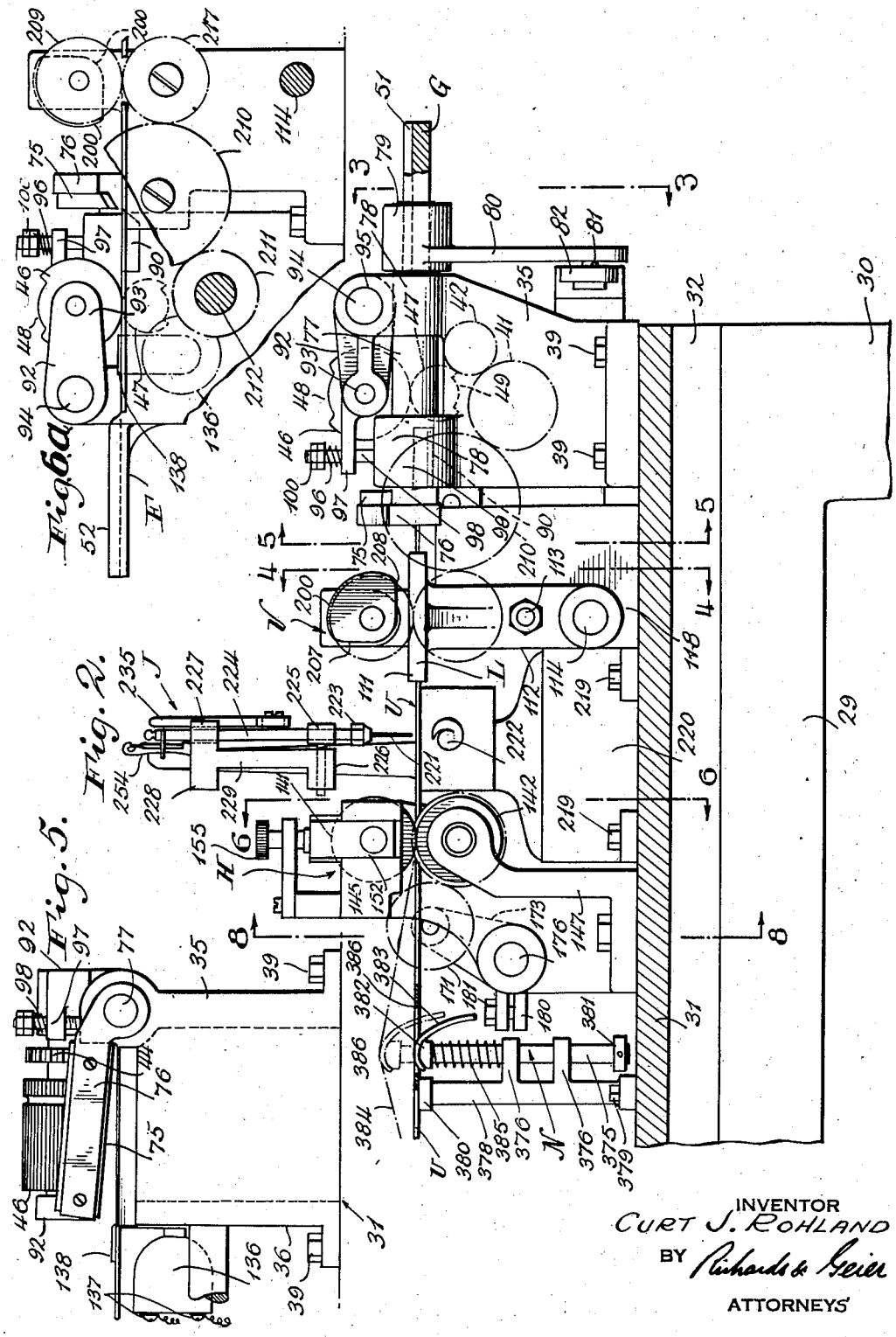

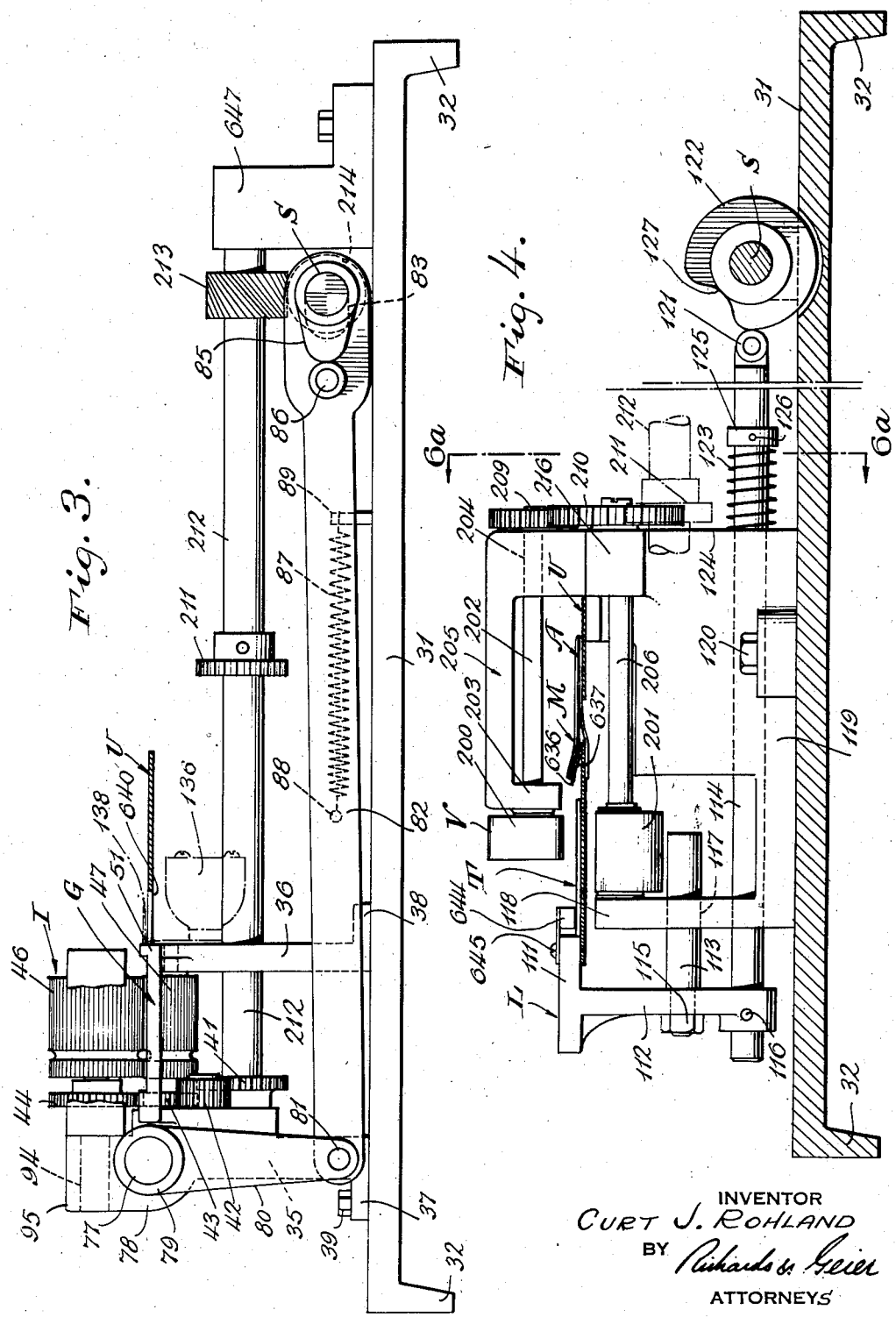

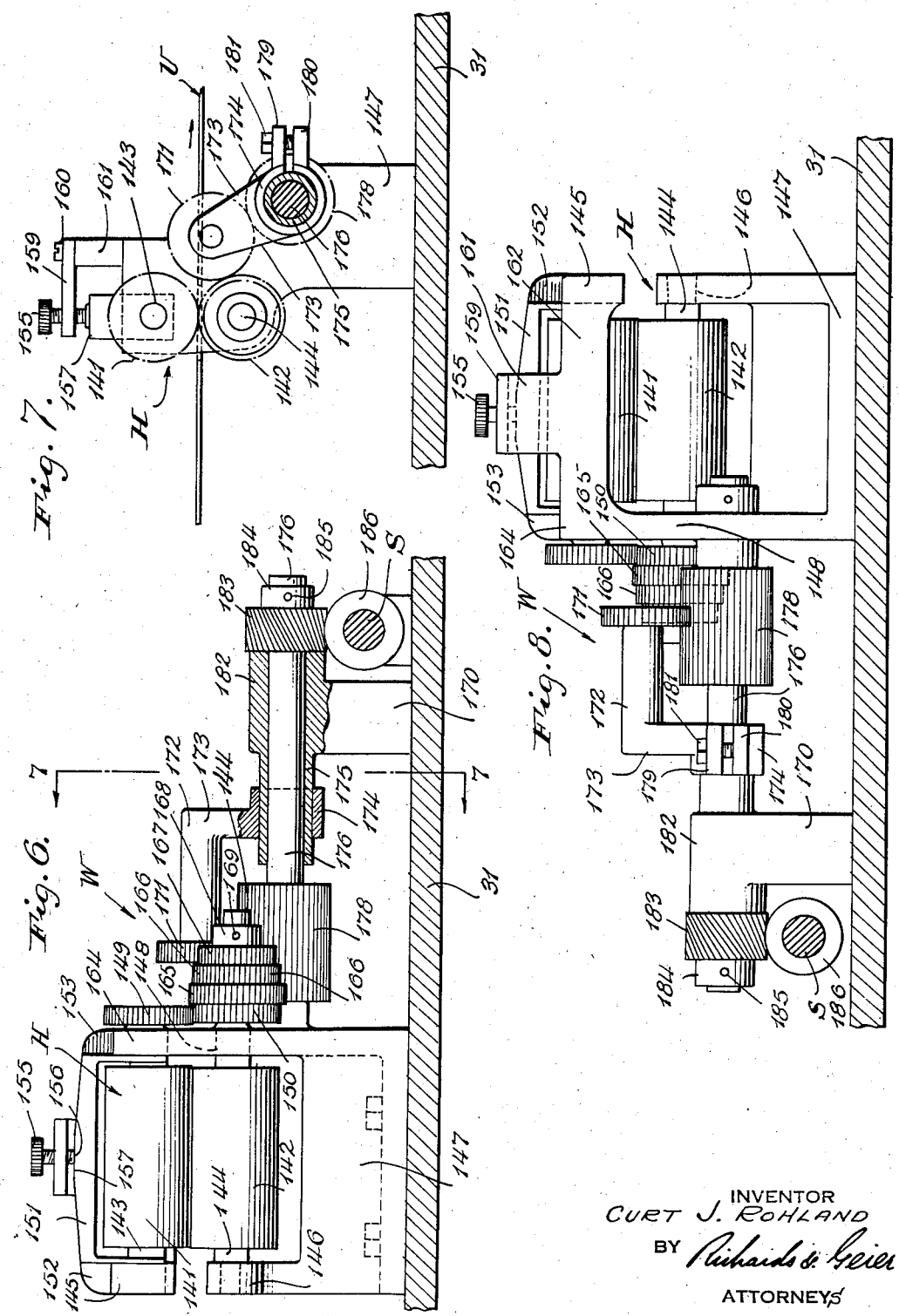

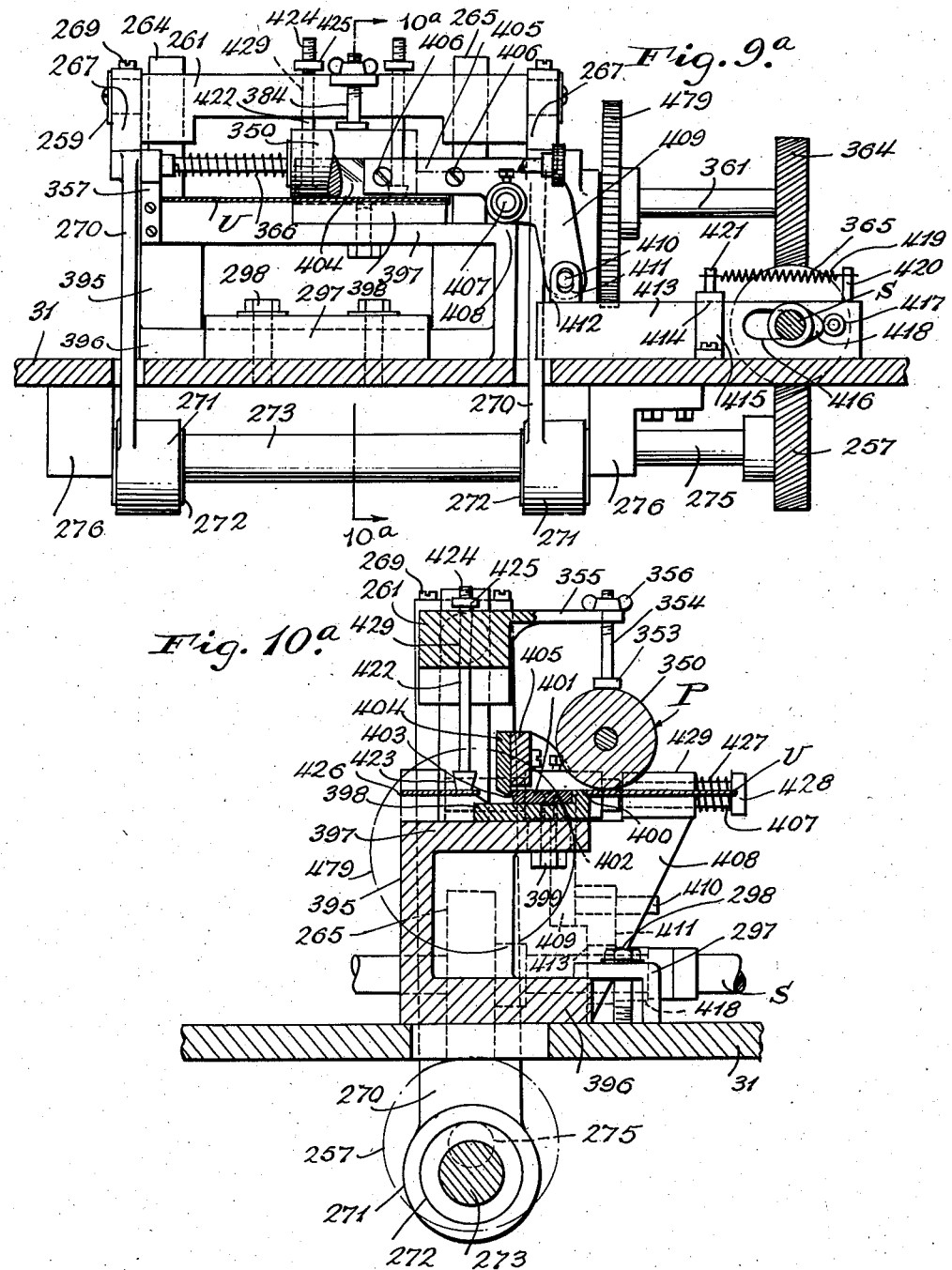

June 28, 1938.  C. J. ROHLAND  2,121,986
METHOD FOR MAKING HAIR WAVING PADS
Filed Aug. 22, 1935  16 Sheets-Sheet 8

INVENTOR
CURT J. ROHLAND
BY Richards & Geier
ATTORNEYS

June 28, 1938.  C. J. ROHLAND  2,121,986
METHOD FOR MAKING HAIR WAVING PADS
Filed Aug. 22, 1935   16 Sheets-Sheet 9

INVENTOR
CURT J. ROHLAND
BY
ATTORNEYS

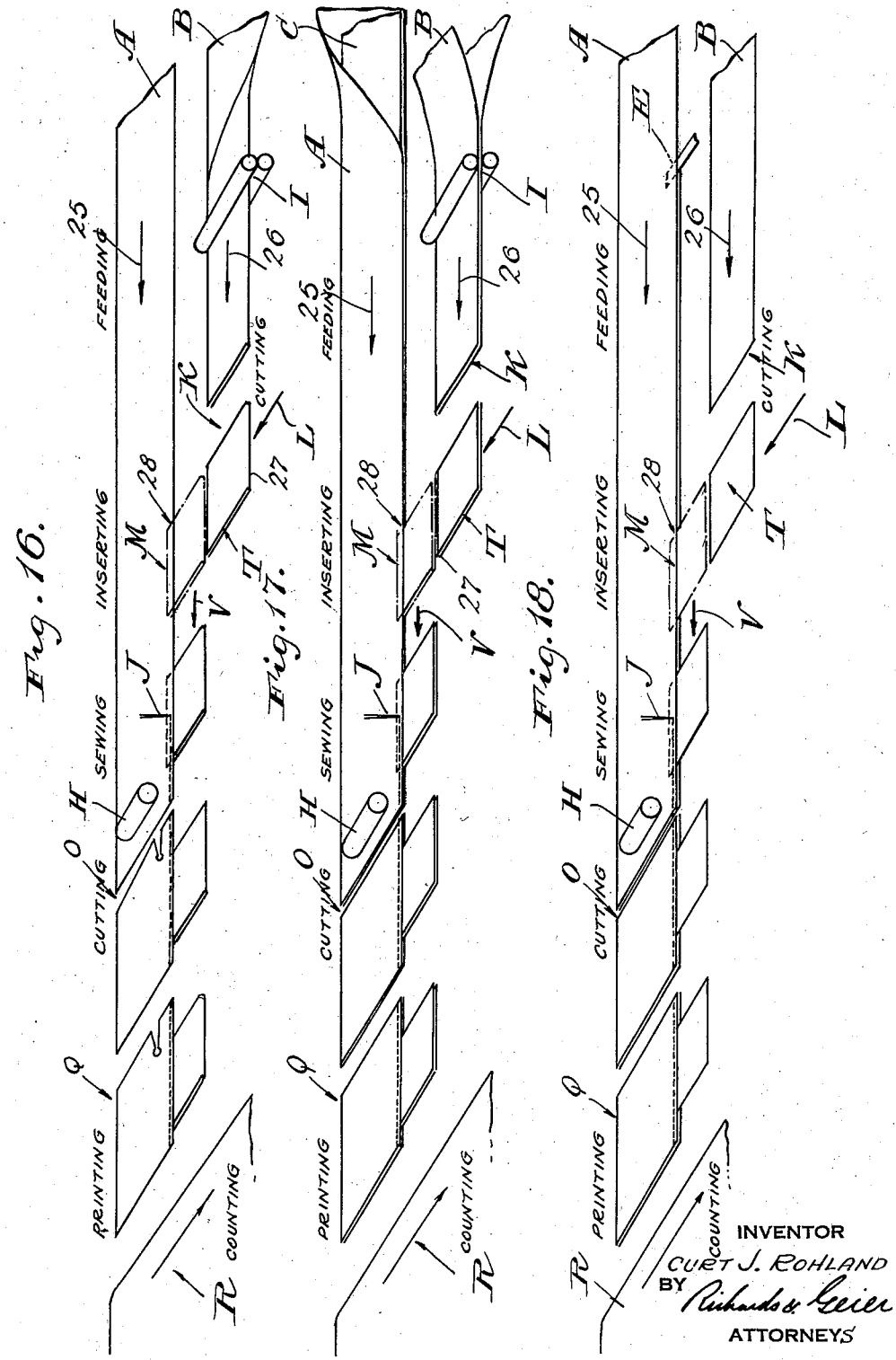

June 28, 1938.  C. J. ROHLAND  2,121,986
METHOD FOR MAKING HAIR WAVING PADS
Filed Aug. 22, 1935  16 Sheets—Sheet 13
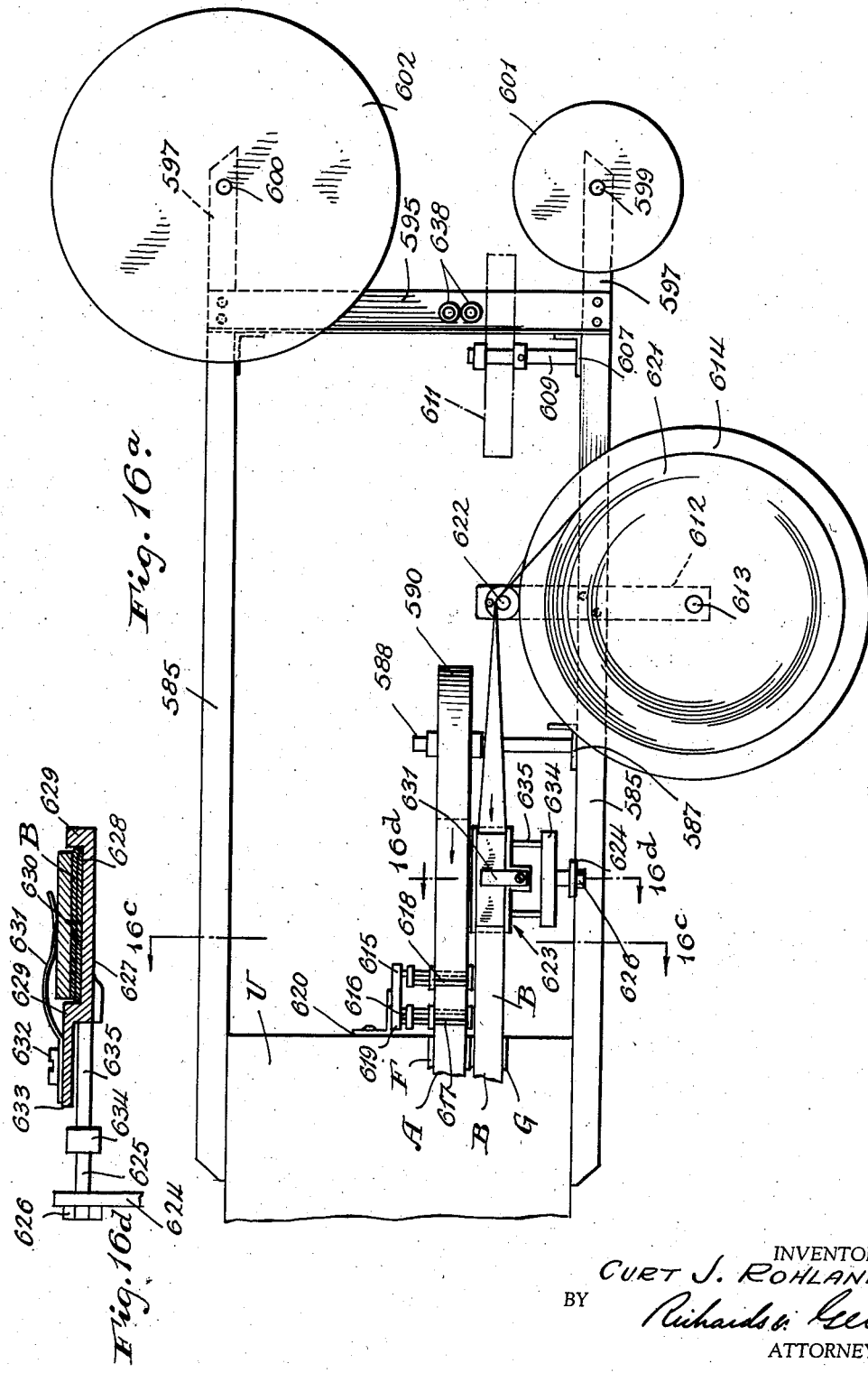
INVENTOR.
CURT J. ROHLAND
BY
ATTORNEYS

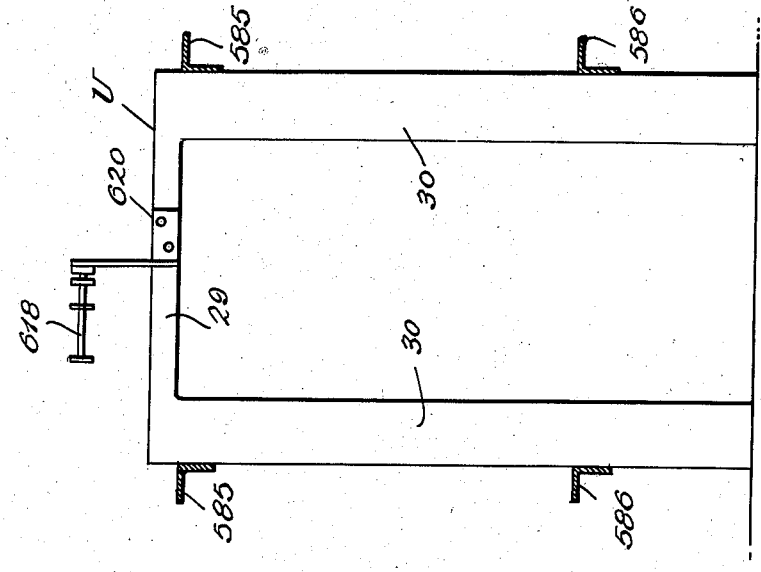

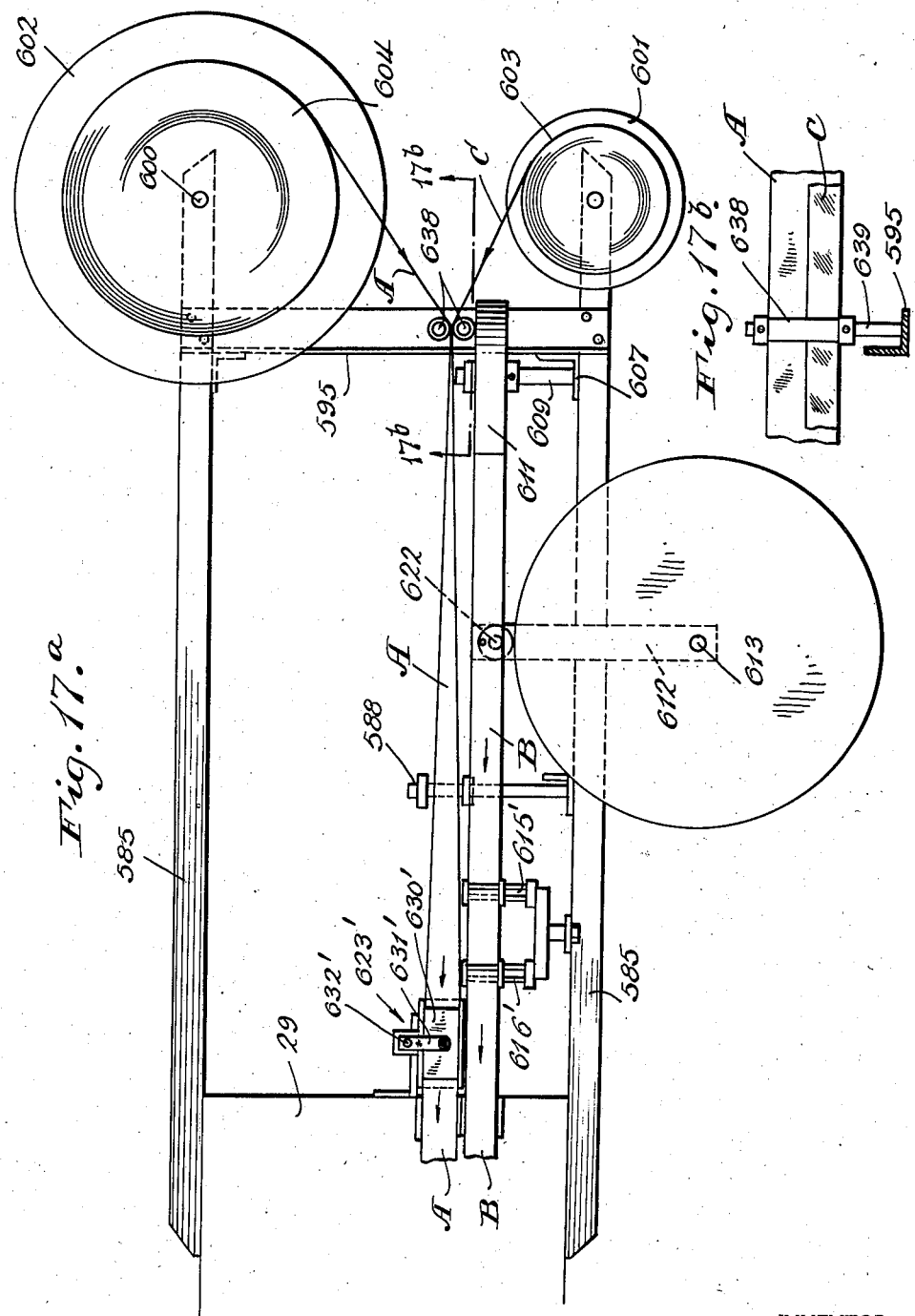

June 28, 1938. C. J. ROHLAND 2,121,986
METHOD FOR MAKING HAIR WAVING PADS
Filed Aug. 22, 1935 16 Sheets-Sheet 16
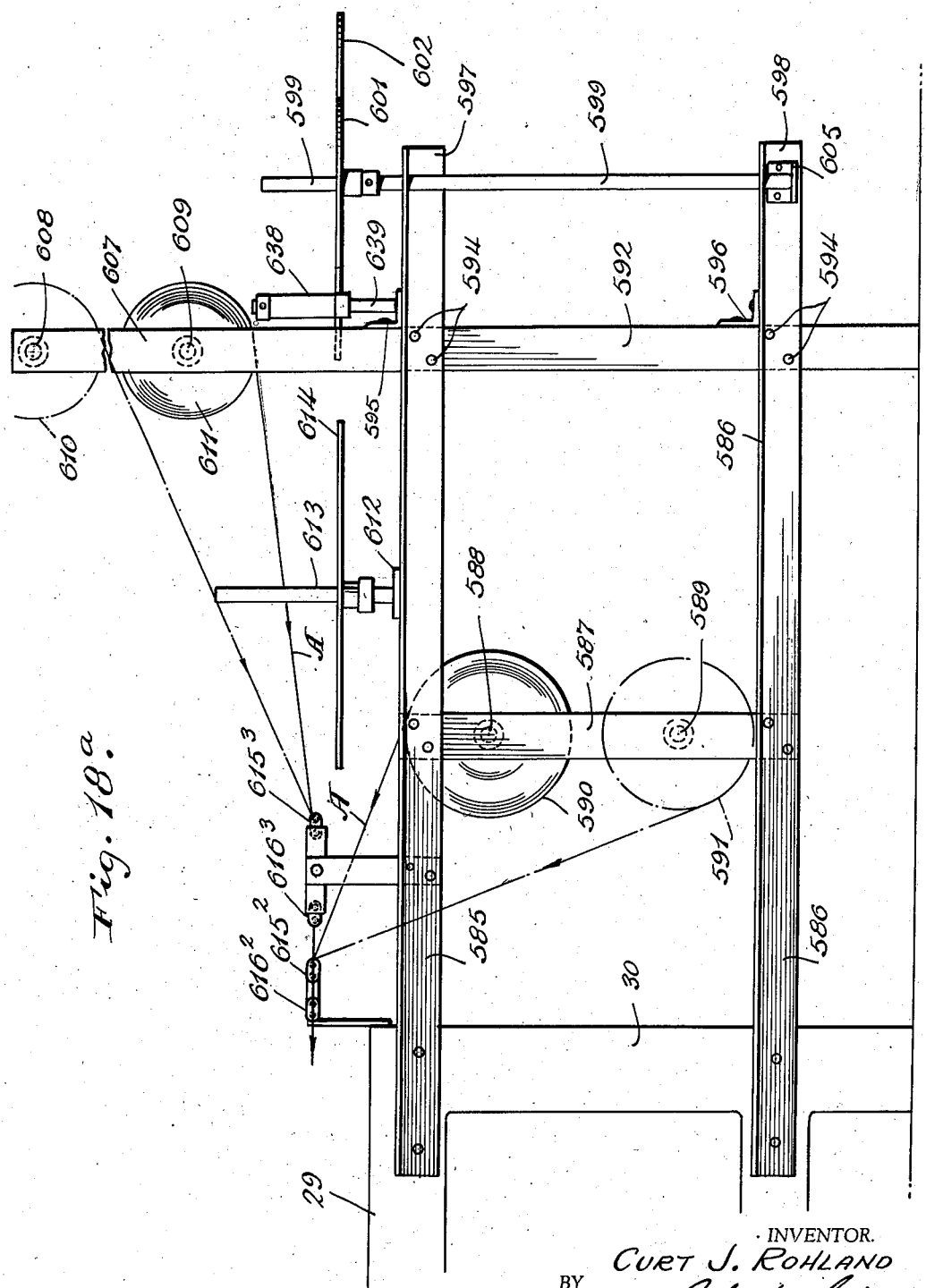
Fig. 18ª.
INVENTOR.
CURT J. ROHLAND
BY
ATTORNEYS Patented June 28, 1938

2,121,986

UNITED STATES PATENT OFFICE 2,121,986

METHOD FOR MAKING HAIR WAVING PADS

Curt J. Rohland, East Providence, R. I., assignor to The Nestle-Lemur Company, New York, N. Y., a corporation of Ohio Application August 22, 1935, Serial No. 37,285

3 Claims. (Cl. 112—262)

The present application relates to a method and machine for making hair waving pads, and it also relates to the hair waving pads produced thereby.

In my prior application Serial No. 678,162, filed June 29, 1933, there is disclosed a pad making machine in which a strip of an absorbent material, such as filter paper, flannel or felt and a strip of non-absorbent, such as a non-permeable, a parchmentized paper and/or foil, are fed substantially continuously from rolls on opposite sides of the assembling machine toward a centrally positioned sewing machine unit. If desired a wire may be fed with the wrapper and caused to adhere thereto.

The absorbent material is preferably fed at such a rate or in such widths in the preferred embodiment that there is a substantially greater area of the wrapper material for each section of the absorbent material in the final pads, whereby when the absorbent material is saturated with liquid and wrapped around the hair, it may be completely encompassed by the wrapper material.

In the preferred construction shown according to this prior application the wrapper elements were imprinted while still being fed as a continuous strip and such wrapper and absorbent strips were not cut to form suitable strips for the single hair waving pads until they are adjacent to the sewing machine. In this position they were laid in slightly overlapping position with the felt projecting substantially for the major portion of its area beyond the wrapper. The sewing machine sews the absorbent material and the wrapper material together at said overlapped portion to form the final pad unit.

In another application, Serial No. 683,613, filed August 4, 1933, there is disclosed a sewing machine unit with a floating needle, permitting the needle to move with the readily tearable wrapper strip. The strip of the wrapper material is drawn through the machine and then successively assembled with foil and the absorbent material, the foil and absorbent materials being also fed continuously from rolls transversely toward the advancing wrapper strip.

In the preferred embodiment, the wrapper was formed from a strip of parchment or other non-permeable paper which was folded as it was fed. Then the foil strip was inserted entirely therebetween and cut, and then subsequently the absorbent strip was merely inserted between the edges of the folded strip and then was cut, the foil and absorbent material being held in their position by suitable rollers, while the floating needle of the sewing device sewed the whole together.

After the sewing was completed the advancing wrapper strip was cut to form the individual pads, and these individual pads were imprinted with suitable trade-marks or legends and then automatically counted and subsequently packaged.

It has been found desirable to make a machine which would be capable of still additional operations than the machine specifically described above and particularly which would be capable of assembling both the wrapper and absorbent material, either in folded condition or in unfolded condition, as desired.

In assembling a folded strip of the wrapper and folded strip of the absorbent it has been found most suitable to feed the strips parallelly to each other, with a wrapper being fed at a substantially greater rate than the absorbent. Generally, it has been found desirable to feed the absorbent strip intermittently and the wrapper strip continuously, and then to cut the absorbent strip at intervals to secure sections of the absorbent of a shorter length, than the corresponding portion of the wrapper strip to which the absorbent strip is attached.

After the absorbent strip is cut into sections, it is moved inwardly into partially superimposed position in respect to the wrapper strip and the two are sewn together, preferably by a single thread chain stitch, and preferably by a needle unit which may move with the wrapper during the formation of each stitch so that the wrapper as it is drawn past the sewing machine will not tend to be torn by the needle.

In assembling the absorbent strip with the wrapper strip, it is desirable that the edge of the wrapper strip if folded or multiple, be separated, so as to permit the absorbent strip to be inserted therebetween and it is a particular feature of the present invention where the wrapper strip consists of a multiple ply of foil and paper firmly connected by a paraffin or wax adhesive bond, to release said bond sufficiently during the assembly of the absorbent strip with the wrapper strip to permit said absorbent strip to be inserted between the edges of said plies.

In certain types of hair waving pads it is desirable that cut-outs be made to eliminate the necessity of a clip, as for example as is disclosed in Comerford Patent No. 1,856,692.

To accomplish a cutting operation of this character, it has been found most satisfactory to provide a die which will act upon the wrapper strip to cut out portions thereof in accordance with a desired shape which is to be obtained.

At the same time, a cutter device may be employed to sever the strip before, during or after the die cutting operation.

After the die cutting operation, it has been found most desirable then to emboss, imprint or otherwise mark the wrapper section of the individual pads with a trade-mark or descriptive legend as may be desired and after this imprinting or embossing operation. The individual pad units then are counted off in piles of say about fifty each, and are carried by a belt to a place where they may be packaged and/or otherwise disposed of.

It is an important feature of the present invention that the successive operations of feeding the wrapper and absorbent strips, of folding one or both of these strips, of cutting the absorbent strip, of assembling the cut absorbent strip with the separated wrapper strip, of cutting and/or die cutting the wrapper strip, of imprinting and/or embossing and of counting are synchronized so that all these operations will take place at a predetermined interval in respect to each other, and at predetermined positions.

This invention will appear more clearly from the following detailed description when taken in connection with the accompanying drawings showing by way of example, preferred embodiments of the inventive idea.

In the drawings:

Figure 1 is a top plan view of the entire machine according to the present application.

Figure 2 is a side view upon an enlarged scale of the section indicated by the line 2—2 of Figure 1.

Figures 3, 4, 5 and 6 are transverse sectional views upon the lines 3—3, 4—4, 5—5, 6—6 of Figure 2.

Figure 6a is a fragmentary side view of a portion of the mechanism upon the line 6a—6a of Figure 4.

Figure 7 is a transverse side sectional view upon the line 7—7 of Figure 6.

Figure 8 is a transverse sectional view upon the line 8—8 of Figure 2.

Figures 8a and 8b are respectively front and side views upon an enlarged scale of the sewing machine mechanism.

Figure 9 is a transverse sectional view upon the line 9—9 of Figure 1 upon an enlarged scale showing the die cutting device.

Figure 10 is a top elevation upon the line 10—10 of Figure 9 in partial section.

Figures 9a and 10a are similar views to Figures 9 and 10 in which, however, an alternative form of cutting device is utilized on the machine.

Figures 16, 17 and 18 are diagrammatic perspective views illustratively showing the various methods of operating the machine to assemble and manufacture hair waving pads of different constructions.

Figures 16a to 16d illustrate the assembling of the wrapper and absorbent materials in making according to the construction of Fig. 16; Figure 16a being a top view of the feeding and folding mechanism; Figure 16b being an end view of the frame; Figure 16c being a section upon the line 16c—16c of Fig. 16a; Figure 16d being a sectional view upon an enlarged scale upon the line 16d—16d of Figure 16a, and Figure 16e being a diagrammatic sectional view illustrating how the absorbent sections are inserted in superimposed position with respect to the wrapper sheet.

Figures 17a to 17c show the feeding, folding and assembly operations to produce the construction of Figure 17, Figure 17a being a top view; Figure 17b being a fragmentary side sectional view on enlarged scale, on the line 17b—17b of Figure 17a and Figure 17c being a diagrammatic cross sectional view on enlarged scale indicating the insertion of the severed absorbent sections into the folded wrapper strip.

Figures 18a and 18b illustrate the construction of the pad according to Figure 18; Figure 18a being a side elevation view and Figure 18b being a diagrammatic side sectional view illustrating the assembly of the flannel sections with the wrapper strip.

Referring particularly to Figures 16 to 18, the wrapper material A and the flannel of felt material B are fed forwardly to the left, as indicated by the arrows 25.

The absorbent material B may consist of flannel, doubled so that its opening will be adjacent the wrapper, as indicated in Figure 16, so that its opening may be away from the wrapper, as indicated in Figure 17, or it may consist of an unfolded sheet of material as indicated in Figure 18.

Strips of filter paper and/or strips of felt may also be utilized alone or in combination with other absorbent materials as indicated in Figures 16 and 17.

The wrapper strip A on the other hand may consist of a single strip of material, as indicated in Figure 16, or it may be folded to enclose a foil strip C as indicated in Figure 17.

In Figure 18 the wrapper D preferably consists of a strip of foil and paper paraffined or waxed together, which may be subjected to the action of a heater or separator element E to permit a separation of the edges and insertion of the absorbent material at the proper position where it may be sewed in location during subsequent operations of the machine.

Referring to Figure 1 the guide for the wrapper strip A is indicated at F while the guide for the final strip is indicated at G.

Figure 12:
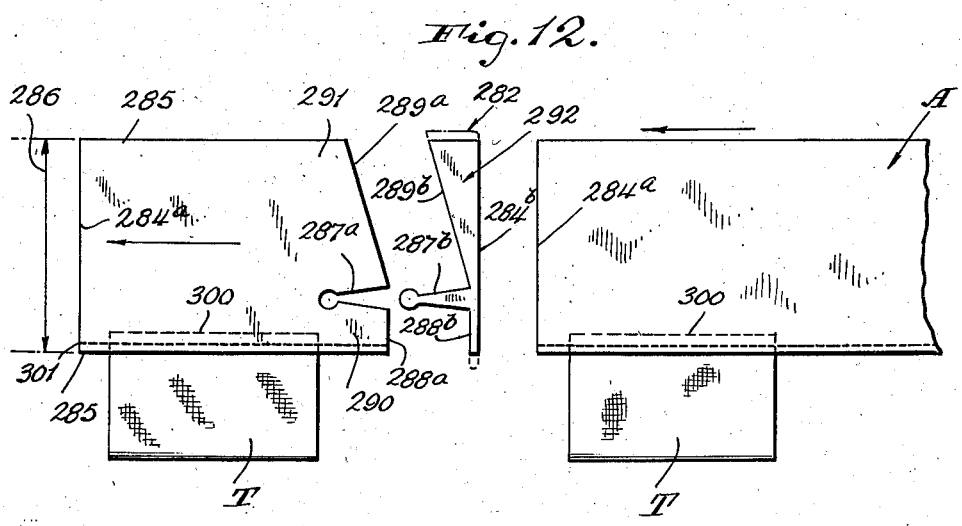
Figure 12 is a diagrammatic view illustrating the operations and movement of the pad through the die and cutting device of Figures 9, 10 and 11.

It is desirable in making the pads, as indicated at the left of Figure 16 and in Figure 12 that the flannel strip be of substantially lesser length than the wrapper strip to which it is sewn and for this reason it is desirable to have an intermittent feed 26 of the flannel with a substantially continuous feed 25 of the wrapper strip A.

Referring to Figure 1, the continuous feed of the wrapper strip A is obtained by the continuous rollers H which are provided with an adjustment S enabling regulation of the rate of feed, while the intermittent feed is achieved by means of the intermittent mutilated rollers I.

The rollers H continuously draw the wrapper sheet A through the sewing machine J and the intermittent rollers I intermittently advance the flannel or absorbent sheet B in synchronism with the cutter device K.

The inserter device L pushes the severed flannel pieces into slightly overlapped position in respect to the folded multiple or single ply wrapper sheet A, so that the sewing machine will form a continuous running stitch through the superimposed position and permanently attach the absorbent material to the main wrapper strip.

The inserter device L preferably works in synchronism with the pickup device V which takes the form of a mutilated roller, releasing the multi-ply wrapper strip at its edge adjacent the absorbent strip when the inserter device L acts to insert the folded and cut flannel therebetween; and gripping the cut absorbent strip in position in the continuous wrapper strip, so that assembly will be advanced to the sewing machine with assurance that the wrapper and cut absorbent strips will be sewn together in proper position.

After the cut flannel sections have been sewn into position by the sewing machine J and have passed the main feed rollers H, the assembly passes over the tensioning device N. The device N assures that a satisfactory tension will be maintained at all times on the strip in being fed to the die cutter O so that it will not be buckled or doubled up in the intervals when the clamp roller P holds the advancing strip A against further movement until the die cutter O has completed its operation upon the previous pad section.

After the die cutting operation, the severed sheets are then picked up by the printing machine Q where they are imprinted and/or embossed and they are then passed onto the counter and conveyor device R.

The main shaft S shown in Figure 1 will synchronize the various portions of the machine and assure that the feeding, sewing, imprinting and cutting operations will take place in synchronism in the predetermined time intervals in respect to each other.

As shown in Figure 16, the fold 27 of a folded cut flannel section T may extend outwardly from the single or multi-ply wrapper strip A or multi or single ply section T may be inserted between the plies of the wrapper strip A as indicated in Figures 17 and 18.

As soon as the sections T are inserted or positioned in slightly overlapping position as indicated at 28, in Figs. 16 to 18, inclusive, with the aid of the device M (see Figs. 16e, 17c and 18b) the intermittent rolls V (see Figs. 1 and 2) will seize the overlapping portions of the absorbent section T and the wrapper sheet A and hold them in position while the wrapper section is being advanced to the sewing machine J.

In Figures 16 to 18, after the sewing operation, the cutting device at the position O will sever the wrapper strip which will be imprinted and/or embossed at the position Q.

After the imprinting and embossing the pad units will be counted off in piles of say twenty-five upon the conveyor device or belt indicated at the position R.

Referring to Figures 1, 2 and 3, the machine of the present invention is provided with a main table support 29 having legs 30 on the table 30 is supported the bed plate 31 to which are bolted the various elements constituting the assembly machine. As indicated best in Figures 3 and 4, the bed plate 31 is provided with side flanges 32 which extend the length of the machine table 29. Supported on the bed plate 31 at the right end of the machine as shown in Figures 1 and 2 are the structure members 35, 36, which are provided with foot flanges 37, 38, bolted as indicated at 39 to said bed plate. These plates carry the shaft 212 which drives the gear 41 which in turn drives the pinion 42 and the meshing gears 43 and 44.

The gears 43 and 44 (see Figs. 1 to 3) connected to drive the mutilated feed rollers 46 and 47 which rollers are cut out as indicated at 48, 49 (see Figure 2) to cause an intermittent feed of the folded flannel sheet into the guide G.

The wrapper strip which is fed through the guide F, passes on to the portion 50 of the main table V where it is fed in parallelism with the flannel strip being fed over the runway G, the paper or wrapper strip F being engaged by feed rollers H.

It will be noted that the runway G is provided with side elevations 51 while the runway F is provided with side ridges 52 respectively to guide the flannel or absorbent strip and the parchment or foil strip into the table V at 50.

The cutter device K (see Figures 1, 2 and 3) is provided with a blade 75 carried by the reciprocating member 76 which is mounted on the shaft 77, said shaft 77 being provided with the bearings 78 on the side frame member 35. The shaft is fixed at its right end in the eye 79 at the upper end of the lever 80 which lever at its lower end is pivotally connected as at 81 to the end of the link 82 (see Figure 3).

The other end of the link 82 is provided with an elongated eye 83 which is received upon the main drive shaft S and which shaft carries the cam 85 cooperating with the roller 86 on the link 82. The spring 87 which is connected at 88 to the link 82 and at 89 to the base plate 31 biases the link 82 to the right as shown in Fig. 3 to maintain said roller 86 in contact with the cam 85 at all times.

In the position shown in Figures 2 and 3, the cutter K is cutting the folded or multi-ply flannel or single ply-felt strip as it is intermittently fed by the mutilated feed rollers 46, and 47 and this cutting operation will occur every time the cam arrives in the position shown in Figure 3. This position of the cam 85 as shown in Fig. 3 causes the link to move to its extreme left position, and at the same time causes the arm 76 carrying the cutter blade 75 to swing downwardly across the end of the table U at 90 and sever the absorbent strip B into sections T (see Figs. 16 to 18).

The pressure of the rolls 46, 47 may be varied by the arrangement shown best in Figures 1, 2 and 3.

The upper roller 46 together with its gear 44, is mounted in a clevis 91 (see Figs. 1, 2 and 6a) having the side arms 92, the arms of said clevis being provided with bearings, 93, 93 for the shaft of said upper feed roller 46.

The clevis 91 is pivotally mounted on the shaft 94 which is provided with the bearing 95 on the side frame member 35. The upper roller 46 is normally pressed against the lower roller 47 by the spring 96 reacting against the forwardly extending finger 97 from said clevis arm 92 (see Fig. 3). The spring 96 encircles the pin 98 which is mounted upon the bearing member 78 for the shaft 77. The nuts 100 enable adjustment of the tension on the spring 96.

After the folded flannel strip has been cut the cut portion is left upon the portion 110 of the table U (see Fig. 1) where it is in position to be acted upon by the pusher or inserter element L (see Figures 1, 2 and 4).

The pusher element 12 includes a diverging plate 111 (see Fig. 1) which is provided with a downwardly extending bracket 112 (see Fig. 4) the guide member 113 and the reciprocating shaft 114 at 115 and 116, respectively.

The guide shaft 113 extends through the guide opening 117 in the upwardly extending flange 118 of the base 119 bolted as at 120 to the base plate 31. The shaft 114 extends through the base plate 119 and is provided at its right end with the follow roller 121 which cooperates with the cam 122 and mounted upon the shaft S.

The rod 114 is normally biased to the right, as shown in Figure 4, by the coil spring 123 which reacts at one side against the wall 124 of the base structure 119 and at the other end against the collar 125 fixed at 126 upon the rod or shaft 114.

In operation, when the recess 127 of the cam 122 comes opposite the roller 121, the plate 111 will move to push the felt or flannel section T into position in respect to the folded wrapper strip A (see also Fig. 16e, 17c and 18b).

If the wrapper strip is composed of a sheet of paper and a sheet of foil paraffined together, the edge of the wrapper strip, may be subjected to the action of the separator element E which includes the casing 136 having a heating coil therein and electric connections 137 to separate the edges for insertion of the cut sections T (see Fig. 5).

The heating coil is provided with a fin extension 138 which projects between the edges of the adhering foil and paper strips and applies sufficient heat to melt the paraffin or wax after separation by the element E, the edges of the wrapper strip A will be held apart so that the cut sections T of the flannel strip may be conveniently inserted thereinto by the device M (see Fig. 4).

The wrapper strip A in the meanwhile is being drawn substantially continuously over the guide F and onto the table U at 50 (see Fig. 1) by the feed rollers H which are positioned beyond the sewing machine J.

These feed rollers are best shown in Figures 1, 2, 6 and 8.

Referring to these figures, it will be noted that the feed rollers H include an upper roller 141 and lower roller 142 having respectively the shafts 143 and 144.

The lower roller shaft 144 has bearings at 146 and 148 in the frame structure 147.

The shaft 143 is connected to the driving gear 149, while the shaft 144 is connected to the driving gear 150.

The rollers 141 and 142 are preferably provided with a rubber surfacing and the pressure between them may be varied by providing the upper roller 141 with a bearing yoke 151 which has adjustable slide members 152 and 153 carrying the shaft 143. Said members 152 and 153 fitting into recesses or vertical slots in the members 145 and 164.

The pressure between the rollers 141 and 142 may be varied by the adjusting screw 155, the lower end 156 of which contacts with the flattened portion 157 at the top of the yoke 151.

The screw 155 is carried by the plate 159 which is bolted at 160 (see Fig. 7) to the upwardly extending flange 161 from the transverse member 162 of frame 147. The member 162 carries the structures 145, receiving for the slide members 152 of the yoke 151.

On the same shaft as the gear 150 are provided a series of different diameter gears 165, 166, 167 (see Fig. 6) which are fixed in position by the collar 168 and the pin 169. These gears 165 to 167 may be selectively driven by the gear 171 to control the rate of feed of the wrapper strip between the main feed rollers 141 and 142.

The gear 171 is carried on the arm 172 which is provided with an end flange 173 having the eye 174 pivotally mounted on the sleeve 175 on the shaft 176.

The shaft 176 drives the elongated gear 178 which meshes with and drives the intermediate adjustable gear 171.

As indicated best in Figures 7 and 8, the eye 174 is split and is provided with flanges 179 and 180 which are drawn together by the bolt 181 to clamp tightly the fixed sleeve 175.

By loosening the bolt 181 it is possible to shift the gear 171 both rotatably and longitudinally on the sleeve 175 to enable engagement of the gear 171 with the different driving gears 165, 166, 167 as may be desired.

The arm 173 and the gear 178 are each of such length as to give assurance that the gear 171 will always mesh with and be driven by the gear 178. The gear 178 is driven by the shaft 176 which bears in the sleeve 175, 182, supported on the frame structure 170 attached to the bed plate 31.

The spiral gear 183 is fixed on the shaft 176 by the collar 184 and the pin 185 and is driven by the corresponding gear 186 attached to the main drive shaft S.

Referring to Figs. 6 to 8 and also Figures 1 and 2, it is apparent that by relatively simple adjustment, namely, by loosening the bolt 181 and adjusting the gear 171 to mesh with the desired gear 165, 166, 167, it is possible to regulate the speed of feed of the wrapper strip whereby the length of wrapper relatively to the length of the section T of the absorbent strip may be varied.

After the section T has been cut and inserted by the devices L and M in the continuously feeding wrapper strip A, it is picked up by the mutilated feed rollers V (see Figs. 1, 2 and 4). These mutilated rollers consist of an upper roller 200 and a lower roller 201, the upper roller being connected to a shaft 202 which bears at 203 and 204 in the yoke 205 extending upwardly from the frame 119.

The lower roller 201 turns upon a shaft 206 having bearings in the flange 118 and at 216 in the frame 119 and driven by an intermediate gear 217 between the gears 209 and 210 (see Fig. 6).

The upper roller 200 (see Figs. 1, 2 and 4) is driven by the gear 209 on the end of the shaft 202 which in turn is driven through the gear 210 from the gear 211 on the shaft 212 (see also Fig. 3).

After the flannel or felt strip B has been cut into the sections T, as indicated in Figures 16 to 18, and inserted between the opening device M between the plies of the wrapper strip A, as indicated in Figure 4, the wrapper strip A together with the absorbent section T after it has been picked up by the full diameter portion of the rollers 200 and 201, will be moved up to the sewing machine J.

In connection with the sewing machine J, (see Figs. 1, 2, 8a and 8b) in view of the fact the wrapper strip A is being drawn therethrough at a relatively high rate by the feed rollers H (see Figs. 7, 8 and 9) it has been found necessary to permit the needle to move with the wrapper strip A while making the stitch.

This is most satisfactorily accomplished by a continuous running stitch which has been found most suitable both from the view point of sewing the wrapper strip A to the section T and also from the view point of making the waving pad so that the attachment between the section T and the wrapper A will be best suited for handling and utilization in connection with hair waving operations.

Referring to the sewing machine J, (Figs. 8a and 8b) the machine is supported on the base 220 which is bolted at 219 to the bed plate 31 (see Fig. 2).

The needle 221 feeds the thread in loops to the oscillating element 222 which holds the loop to form a single thread chain stitch between the reciprocations of the needle.

The needle is removably held at 223 on the reciprocating bar 224, which bar has bearings in the movable guide 225 connected to the supporting element 226 and also in the extension 227 of the upper supporting element 228. The front portion of the frame of the machine, as indicated at 229, carries both the supports 226 and 228.

Referring to Figs. 8a and 8b, the lower guide block 225 is carried on the sliding pin 230 which bears in the bore 231 and permits a lateral movement of the needle 221.

The device 222 in combination with the needle 221 forming a continuous running stitch.

The needle bar 224 is operated through a ball and socket connection 232 in the block 233 which slides in the recess 234 at the end of the actuating arm 235. The arm 235 is pivotally mounted at 236 on the frame 237. The frame 237 at its front end carries the structure 229.

The arm 235 is reciprocated through the ball and socket connection 238 to the crank 239 which has an eccentric drive at 240 to the coupling 241 connected to the shaft 242 leading to the gear reduction box 652 (see also Fig. 1).

The shaft 242 rotates shaft 243 which in turn rotates the looper device 222. The thread guide and tension elements 244 and 245 control the feed and tension of the thread in passing to the needle 221. The member 246 on the element 245 is connected by the arm 247 so as to have a limited oscillatory movement through the eccentric connection 248.

In Fig. 8a, the needle 221 is shown moved with the advancing wrapper strip A during the time it is making the running stitch in the fabric. The movement is always less than the length of the slot 250, so that the needle 221 will not touch the edges of the slot 250.

Upon return of the needle 221, the needle will automatically be returned to the front edge of the slot 250 by cooperation between an eye in the plate 251 at the upper end of the needle bar 221 and the elongated cam member 252. The cam member 252 resiliently biased by the flat spring 253.

Upon the next descent of the needle it will enter the wrapper close to the forward edge of the slot 250 and then it will be carried with the wrapper A as it moves downwardly in making of the stitch on the wrapper strip. The upper end of the needle bar during this movement will be free to pivot since the eye member 251 will be moving downwardly over the cam surface 254 of smaller dimension.

Figure 11:
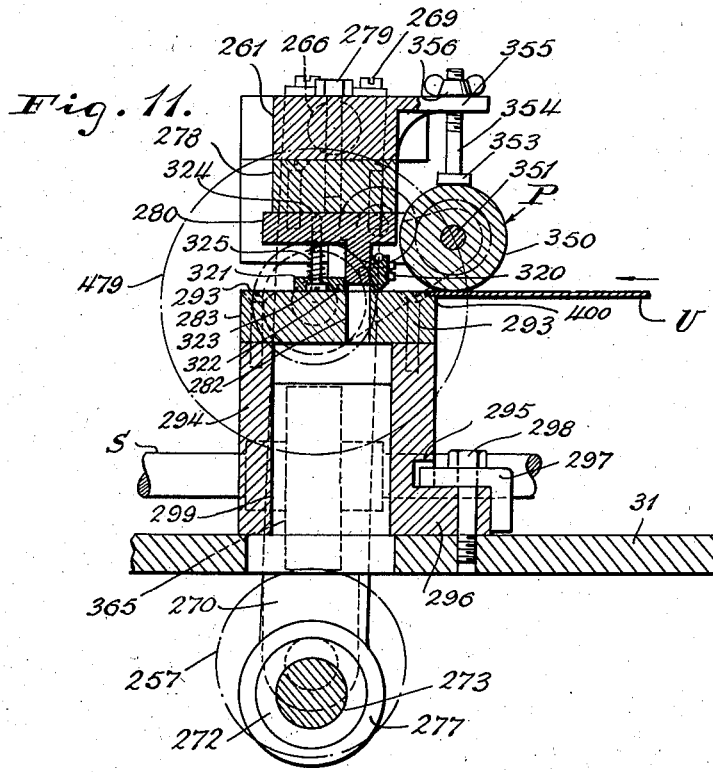
Figure 11 is a side sectional view upon the line 11—11 of Figure 9.

After the absorbent flannel sections T have been sewed to the main wrapper strip A by the sewing machine J and have passed the main feed rollers H, they are passed to the die cutter O shown in Figures 1, 9, 10 and 11, which may also take the form of a straight cutter, as best shown in Figures 9a and 10a, the die cutter of Figures 9, 10 and 11 being interchangeable with the straight cutter in Figures 9a and 10a.

Referring to the die cutter device O in Figs. 1, 9, 10 and 11, the device consists of an upper movable jaw member 260 and a lower fixed jaw member 294. The upper member has a top plate 261 having openings 262 and 263 to receive the guides 264 and 265 extending upwardly from the base plate 31.

The ends of the plate 260 are provided with studs 266 which fit in the upper bearing members 267 and which upper bearing members are bolted at 269 to the lower members 268. The ends of the studs 266 carrying the plates 259 held in position by the screws 258.

The lower members 268 are provided with downwardly extending arms 270 which on their lower ends are provided with eyes 271 fitting upon the eccentrics 272 on the eccentric shaft 273. The shaft 273 is provided with bearing studs 274, 275 respectively bearing in the brackets 276 and 277 extending downwardly from the base plate 31.

As shown in Figures 1, 9a and 11, the shaft 275 is driven by the gear 257 which in turn is driven by the gear 365 on the main shaft S.

To the upper plate 260 is bolted the lower plate 278 by the bolt 279, said plate carrying the upper die 280 by the studs 281.

The upper die 280 is a male element and has a projecting portion corresponding to the recess 282 in the lower die plate 283 (see particularly Figures 10 and 11). The cooperating male and female die members 280 and 281 have straight cutting edges 284 which serve to cut the strip of wrapper material so as to separate the various hair waving pad units. The cutting edge 284 extends beyond the edges of the pads or sides of the wrapper strip as indicated by the dot and dash lines 285 in Fig. 10, the width of the wrapper strip A being indicated by the line 286.

The dies 280 and 283 cut a key hole slot at the cutting edge 287 and also the ends of two flaps at the cutting edges 288 and 289; the flap 288 being a relatively short flap and the flap 289 being relatively elongated and oblique.

The die combination 280, 283, as shown in Figures 9 to 11 will cut the pad as indicated in Figure 12 which is more fully described and claimed in the Comerford Patent No. 1,856,692.

In Fig. 12, the absorbent sections T consisting either of a folded strip or two strips of flannel or a single strip of felt have already been inserted as indicated at 300 beyond the adjacent edge 285 of the wrapper section and have been sewed in position as indicated by the line of stitching 301 by the devices L, M and J. The pad indicated in Figure 12 is provided with a keyhole slot 287a, along edge 289a and a short edge 288a, the edge 288a being formed at the end of the narrow flap 290 and the edge 289a being formed at the end of the long flap 291.

The removed portion indicated at 292 is shown superimposed upon the dot and dash cutting edge 282b of the die, the cut edges on the removed portion 292 being indicated by the same numerals as the die of Figure 10 or the cut pad of Figure 12 but followed by a small "b".

In Figures 9 to 11, the transverse sides of lower die element 283 is connected by the bolts 293 to the hollow base support of the lower jaw 294.

The structure 294 is provided with the recess 295 and the flange 296, said flange being held by the angle 297 and the bolt 298 upon the main floor of the base plate 31.

The lower die 282 is also provided with bevelled edges 332 (see Fig. 9) which fit in the corresponding shaped recesses 333 in the lower support member 294, lower die 283 being clamped in position by the bolt 334 passing through the support structure 294. The upper edge of a base 294 is provided with a recess 400 to receive the edge of the table U.

The hollow interior 299 of the base structure 294 permits the cut sections 292, as shown in Figure 12 to drop away from the machine into a suitable receptacle, after the die cutting operation.

To prevent the cut edges of the pad of Fig. 12 from being drawn up with the die after cutting, stripping elements 320 and 321 are provided. These stripping elements 320 and 321 have a relative movement in respect to the upper die 280 and remove the edges of the cut pad 287a, 288a and 289a and the edge of the strip 284a which is next to be advanced under the cutting die from the upper die 280 as it is being drawn upwardly.

The stripper 321 (see Fig. 11) includes a plate 322 which is carried by the bolt 323 which bolt projects at its upper end into the opening 324 through the upper die support plate 278. The coil spring 325 encircles the shank of the bolt 323 and tends to bias the plate 325 downwardly at all times.

The front stripper 320 includes a bar 326 provided with slots 327 (see Fig. 9) through which slots project the bolts 328 screwed into the male element of the upper cutting die 280.

The sinuous spring 329 reacts against the lower edge 330 of the upper die and in a groove in the upper surface 331 of the stripper 320 and tends to bias the front plate downwardly to hold the advancing wrapper sheet A against lifting with the upper die when removed from the recess 282.

Since the continuously advancing wrapper strip must be held stationary during the cutting operation by the cooperation of the dies 280 and 283, the rubber roller 350 is mounted (see Figs. 9, 10 and 11) upon a shaft 351 so as frictionally to grip the same.

The rubber roller 350 will normally turn with the shaft 351 and advance the wrapper strip passing across the table U and on to the lower die 283 in the direction of the arrow in Figure 11.

However, when the die is in operation the contact element 353 at the lower edge of the adjustable bolt 354 will descend pressing the rubber roller 350 against the wrapper strip and prevent rotation thereof.

The bolt 354 is threaded through a tapped opening 355 in the projecting ledge 356 from the upper frame structure 261 so that it will move up and down with the upper cutting die to stop rotation of the roller 350 and to prevent advance of the wrapper strip A during the die cutting operation.

As shown best in Figures 1, 9 and 10, the shaft 351 of the rubber roller 350 is mounted in the arms 357 and 358. The arm 357 is bolted at 359 to the frame structure 294 while the arm 358 is carried by the support 360 for the driving shaft 361.

The shaft 351 is driven through the gear 362 which is in turn driven by the gear 363 mounted on the end of the shaft 361 which shaft, as indicated in Figure 1, is driven by the gear 364 from the other gear 365 mounted on the main shaft S.

It will be noted that the shaft 351 in Figs. 9, 10 is encircled by the coil spring 366 which reacts against the washer 367 on the roller 350 and against the member 368 on the shaft 351, thus serving as a resilient slip clutch.

While the continuously advancing wrapper strip, however, is held against movement during the die cutting operation by the male die member 280 and female die member 283, it is desirable to hold the advancing wrapper strip before the roller 350 to prevent it from buckling or doubling.

To avoid this, the tensioner device N is provided as shown in Figs. 1 and 2, said device being positioned below the main table U and being provided with a vertical shaft 375. The shaft 375 is provided with bearings 376 in the frame member 378 which frame member is bolted at its lower end, as indicated at 379 to the base 31 and is connected at its upper end as indicated at 380 to the table U.

The vertical shaft 375 is provided with a lower collar 381 and with an upper collar 382 carrying the curved contact element 383 biased upwardly by spring 385 through the opening 386 to take up slack in the wrapper strip as indicated at 384 when the advance of the wrapper strip is prevented by the roller P.

In lieu of the die cutting device, as shown in Figures 9 to 11, it is also possible to use an alternative cutter which will produce straight edge pads (indicated in Figures 17 and 18). The straight edge die cutter may be utilized in lieu of the die cutting arrangements shown in Figs. 9 to 11 by loosening or removing the bolts 279 and removing the upper plate 278 with the connected upper male die member 280 and by loosening the bolt 298 of the angle 297 to remove the lower frame structure 294 together with the attached die 282.

In Figs. 9a and 10a, the lower structure takes the form of a U shaped structure 395, the structure laying on its side and the lower flange 396 thereof being held by the angle member 297. The upper flange 397 of the U structure 395 carries the plate 398 by the bolt 399 which plate is provided with a recess 400 for the edge of the table U.

The plate 401 is bolted at 342 to the plate 398. The cutting edge of said plate 401 is beveled as indicated at 403 and cooperates with the cutter blade 404 which is carried by the bolts 406 on the mounting structure 405. The passage of the cutter blade 404 over the edge 403 severs the wrapper strip into separate sheets as indicated at O in Figures 17 and 18.

The blade support structure 405 is pivotally mounted on the shaft 407 having a bearing 429 on the flange 408 (see Fig. 10a). The support 405 is provided with a downwardly extending arm 409 which, at its lower end, carries a pin 410 fitting in slot 411 in the ear 412 of the transverse sliding member 413.

The sliding member 413 passes through and is guided at 414 in the yoke 414 (see Fig. 9a), and it is provided with a slot 416 fitting on the shaft S.

The member 413, as shown in Fig. 9a is provided with a follower roller 417 which cooperates with the cam 418 on the shaft S, said follower roller 417 being pressed into contact with the cam 418 by the spring 419 which extends between the posts 420 and 421 respectively mounted upon the member 413 and the yoke structure 415.

In operation of the straight edge cutting device of Figs. 9a and 10a, the member 413 will be reciprocated by cooperation of the cam 418 and the follow roller 417 causing reciprocation of the downwardly depending lever member 409 through the pin 410 and slot 411 connection.

As the arm 409 reciprocates, the blade 404 will be moved across the fixed edge 403 carried by the plate 398 severing the wrapper strip with the attached sections of absorbent material T into the individual pad elements.

The upper element 261 in the arrangement shown in Figures 9a and 10a may adjustably carry the contact rods 422 having contact elements 423 at their lower ends and carrying at their upper ends the threaded shanks 424 and the nuts 425. The rods 422 slide loosely through the bores 429. These contact elements 423 press upon the plate 426 when in lowered position and when the roller 350 has been stopped by the contact 353.

The knife 404 is returned to its upper position after cutting by the coil spring 427 (see Fig. 10a) on the shaft 407 reacting on one side against the head 428 and the other against the bearing 429 on the frame structure 408.

After the wrapper strip has been cut apart into the various pad units indicated in Figures 16 to 18, these units are then transferred to the printing and embossing mechanism shown in top view at Q in Fig. 1 and then to the counter and conveyor mechanism indicated at R in Figure 1.

Figure 13:
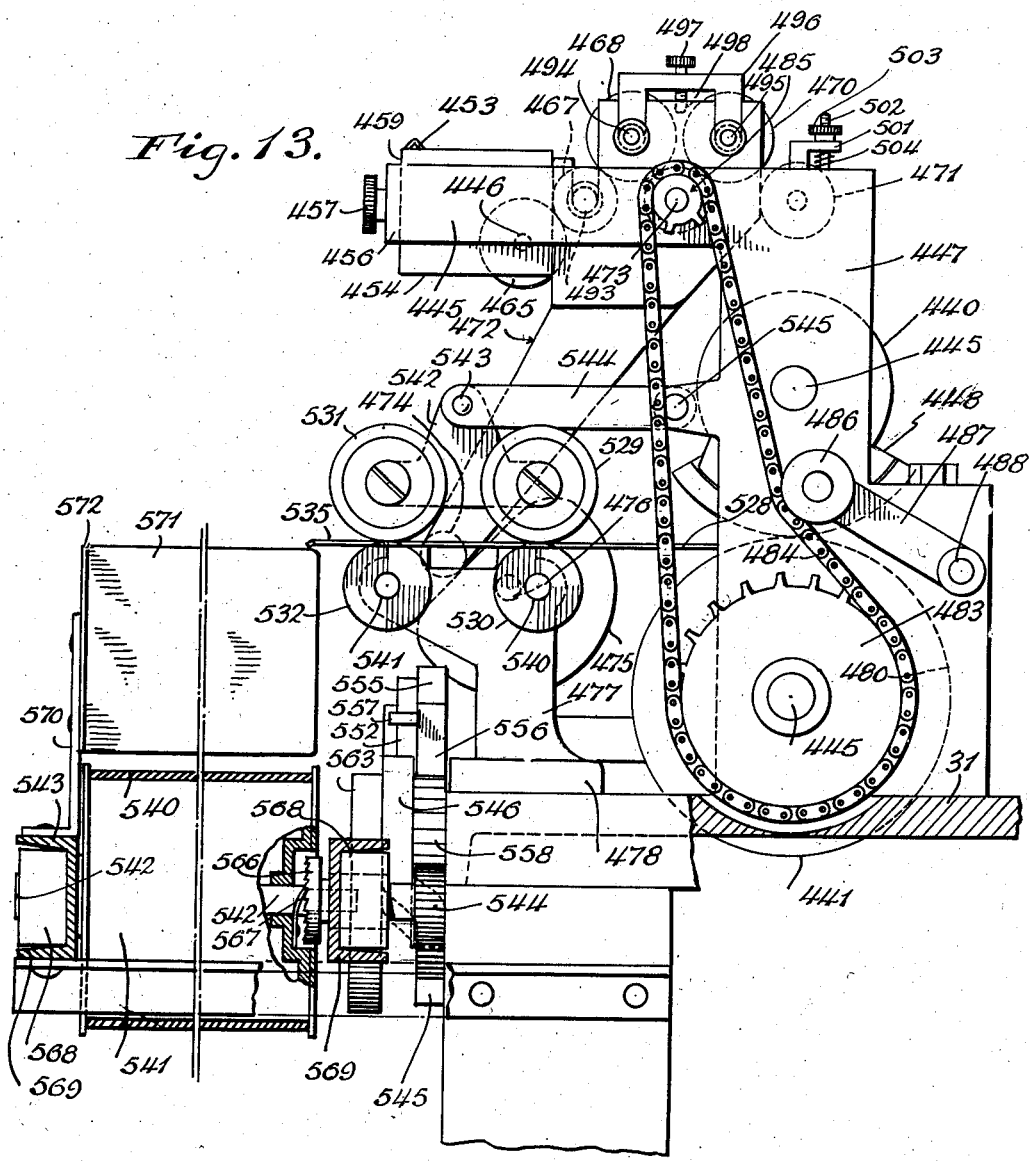
Figure 13 is a side elevational view upon the line 13—13 of Figure 1 showing the imprinting and counting mechanism.
Figure 14:
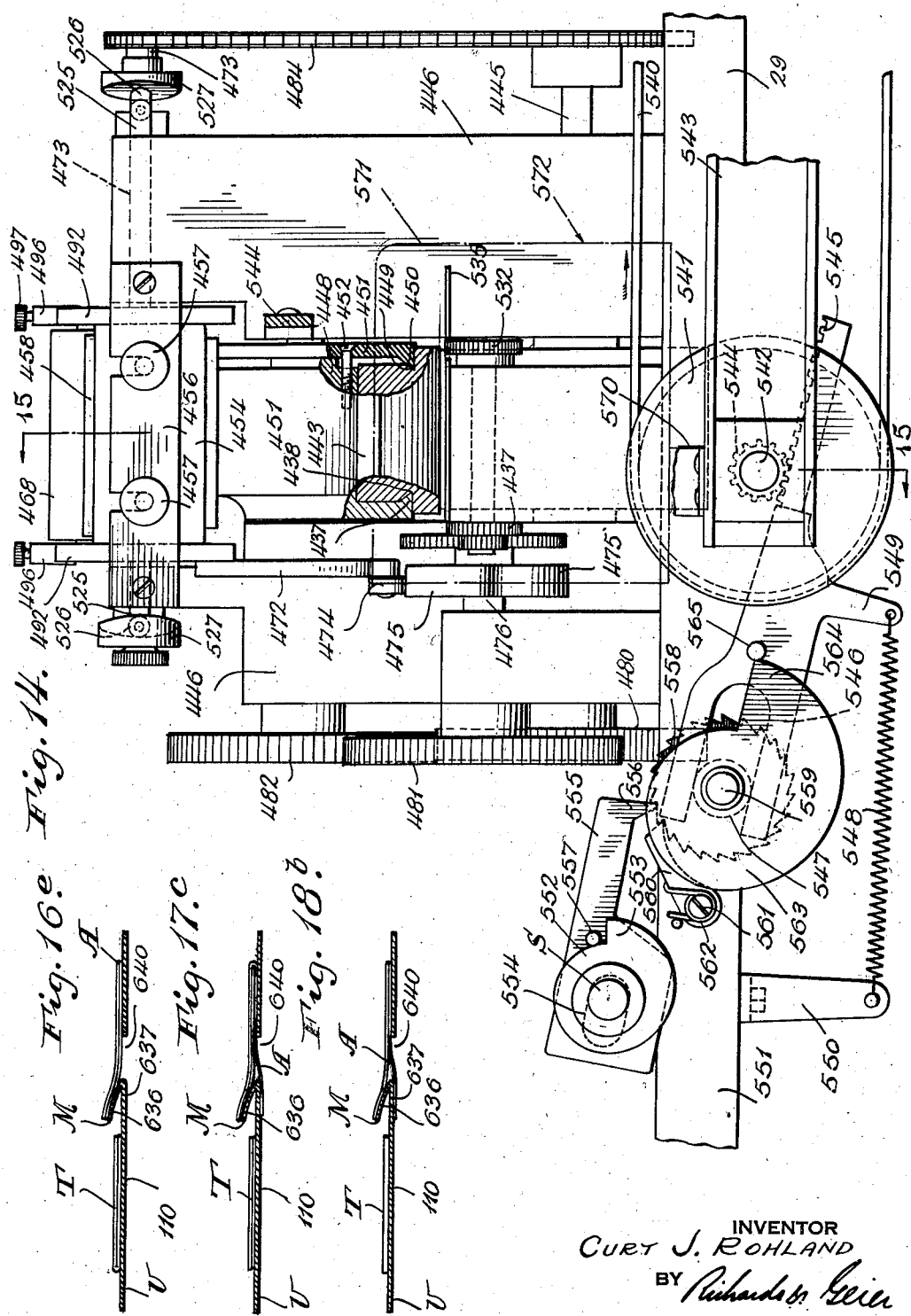
Figure 14 is an end view upon the line 14—14 of Fig. 1 showing the counting mechanism.
Figure 15:
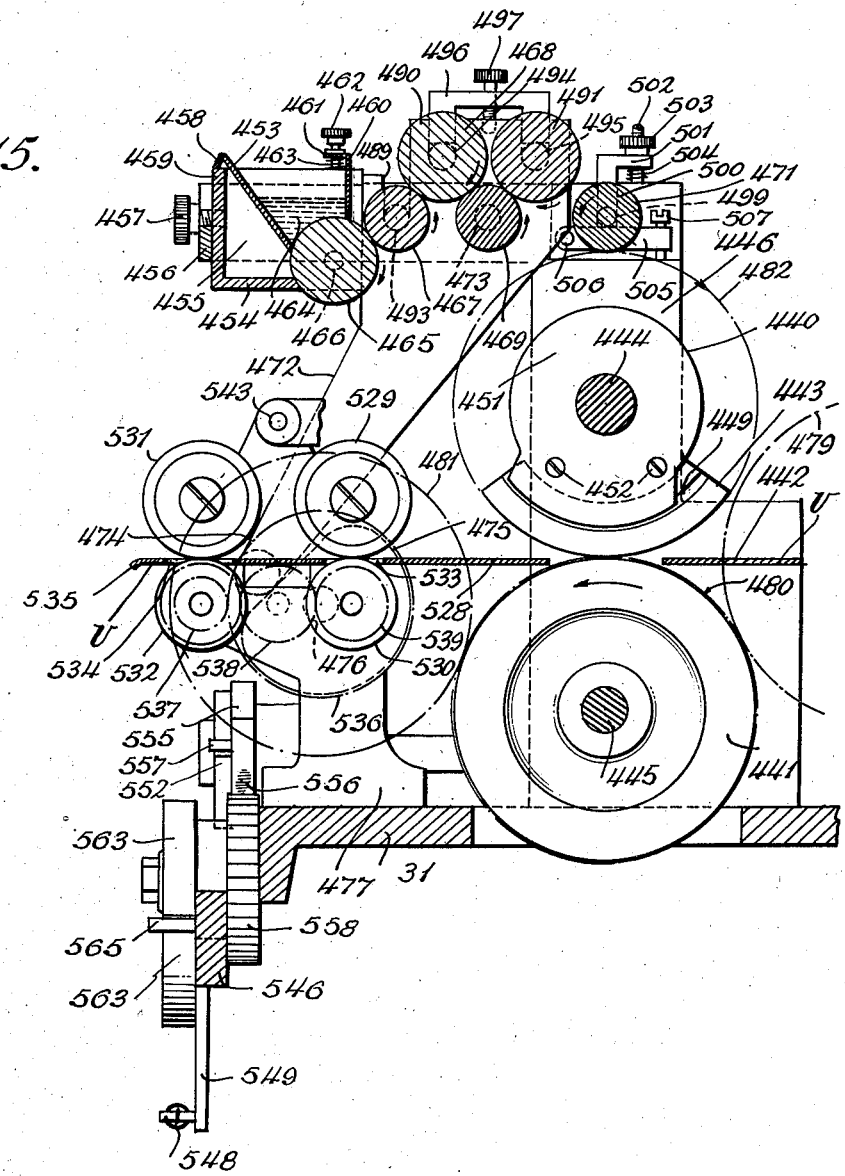
Figure 15 is a side sectional view upon the line 15—15 of Figure 14 showing the imprinting mechanism.

The printing and counting mechanisms Q and R are shown in large scale in Figures 13, 14 and 15.

As indicated in Figures 1, 3 and 15 the printing mechanism consists of a mutilated upper printing roller 440 and a lower contact roller 441. The pads, after cutting, pass onto the section 442 (see Fig. 15) of the table U and are picked up by the arcuate printing plate 443 of the upper mutilated printing roller 440. The upper printing roller 440 is provided with a shaft 444 while the lower contact roller 441 is provided with a similar shaft 445 which shafts are mounted in the side frame members 446 and 447.

The arcuate printing plate section 443 fits in a slot on the base structure 448 and is provided with a groove 449 (see Fig. 14) which receives the edge 450 of the plate 451, said plate 451 being held in position by the bolt 452. A groove 438 on the other side of the plate 443 cooperates with the projection 437 on the base 448 to hold the plate 451 in position at the other side.

The curved printing plate 443 may solely serve for embossing the wrapper sections or solely print said wrapper sections or it may be operated both for printing and embossing.

Where the wrapper sections are to be embossed, the lower roller 441 is provided with a resilient facing material.

Where the upper plate 443 is used for printing, it is inked from the ink pan 453, said ink pan being supported by the box received 454 which is held on the side members 455 carrying the cross member 456, the clamping screws 457 holding said box 454 in position.

The upper portion of the pan is provided with a flange 458 resting against the upper edge 459 of the box 454 and the front side 460 of the pan 453 is provided with a flange 461 which carries a screw element 462 receiving the coil spring 463.

The lower end of the pan is open as indicated at 464 (Fig. 15) and is closed by the first feeding roller 465 rotating on the shaft 466. The roller 465 first receives ink and this ink is transferred to an oscillating group of rollers 467, 468, 469, and 470 and then to the final roller 471 which applies it to the mutilated arcuate printing plate 443.

The various rollers 465, 467, 468 and 470 are carried on the oscillating arm 472 which is pivotally mounted on the axis 473 of the roller 469. The arm 472 actuated through the contact roller 474 on its lower end by the cam 475 (see Figs. 13 and 15) which cam is rotated on a shaft 476 bearing in the standard 477 which standard is provided with a base 478 mounted upon the base plate 31.

The cooperation of the cam 475 and the follower roller 464 on the arm 472 causes the inking rollers 467 to 470 together with the cam 453 to oscillate backwardly and forwardly assuring contact at intervals between the last inking supply roller 470 and the transfer roller 471.

The inking rollers 467 to 470 and the printing rolls 440 and 441 are driven from the gear 479 (see Fig. 1) through the gears 480, 481 and 482. The gear 480 drives the shaft 445 and meshes with an upper gear 482 which drives the shaft 444. The opposite end of the shaft 445 from that carrying the gear 480 is provided with a sprocket 483 which carries the linked chain 484, said linked chain also fitting over an upper sprocket 485 on an upper shaft 483. The sprocket chain 484 is held in close mesh with the sprockets 483 and 485 by the tightening roller 486 carried on the arm 487 and pivotally mounted at 488 on the frame member 447.

It will be noted that the trunnions of inking rollers 467, 468 and 470 are respectively positioned in slots 489, 490 and 491 in the plates 492 on the arm 472. The axle or trunnion 493 of the roller 467 is held in the slot by the roll 468 while the axles 494 and 495 of the rollers 468 and 470 are held in position by the yoke 496 which has the set screw 497 fitting into a tapped opening in the upper part of the frame structure as indicated at 498 in Fig. 13.

The shaft 499 of the fixed inking roller 471 (see Fig. 15) is also supported in a slot 500 and is held therein by the L member 501 which is received on the screw 502 carrying the knurled fitting nut 503 to adjust the tension on the spring 504.

The arm 505 (see Fig. 15) pivotally mounted at 506 on the frame 446 and adjustably located by the screw 507 enables the adjustment of the position of the roller 471 and the amount of movement thereof when it contacts with the mutilated plate 443.

In operation, the mutilated printing roller 440 will be inked by the transfer roller 471 which in turn is fed by the oscillating rollers 467 to 470.

To spread the ink uniformly upon the roller 470 before transfer of the ink to the roller 471, the roller 469 is caused to oscillate transversely during its rotation in the manner best shown in Fig. 14 and also shown in smaller scale in Fig. 1.

As shown in Figs. 1 and 14, the ends 525 of the shaft 473 of the inking roller 469 are provided with cam members 527 which contact with the rollers members 526 fixed on the frame 446—447.

This arrangement will cause the roller 469 to move transversely to insure a uniform spread of ink on the roller 470.

The arcuate plate 443 in printing and/or embossing the pad units of Figs. 12 and 16 to 18 will pick up and advance the pad units from the table section 442 to the section of the table 528 where they will be picked up successively by the friction roller combinations 529 and 530, and 531 and 532 (see Fig. 15).

These rollers, as indicated in Figs. 13 to 15 contact through openings 533 and 534 in the end section 535 of the table U and grip the cut and unprinted pad units adjacent the line of sewing so that the ink if applied to the wrapper section will not be smeared.

The feed roller combinations 529 and 530, and 531 and 532 are driven by the gear 536 on the shaft 476 turning with the main gear 481, the gear 536 meshing with the gear 537 which in turn drives the gears 538 and 539, the upper rollers 531 and 529 being weighted at 546 and 547 (see Fig. 1) and respectively driven by their contact with the lower rollers 532 and 538.

As indicated in Figure 13, the shafts 540 and 541 of the lower rollers 530 and 532 are supported by the bracket 477 while the upper rollers 529 and 531 are carried by the weighted element 542 suspended at 543 from the arm 544 pivotally mounted at 545 on the frame 447.

The last pair of rollers 531 and 532 will move the pad unit with sufficient velocity to project it onto the carrier belt 540 of the carrier and counting mechanism R, now to be described.

The belt 540 (Fig. 13) as shown passes over a pulley 541, a corresponding pulley (not shown) being provided at the other side of the machine. The pulley 541 is mounted on the shaft 542 which in turn is mounted on the bracket 543 attached to the frame of the machine 29. The pulley 542 is turned through a pinion 544 (see Fig. 14) which meshes with the rack 545.

The rack 545 is provided with a clevis or fork 546 sliding on the shaft element 547, the spring 548 extending between the arm 549 of the rack 545 and the arm 550 attached to the frame structure 551, tending to draw the rack 545 to the left.

The shaft S terminates in the connection to the cam 552 having the lobe 553, said shaft having a slotted connection 554 to an arm 555 carrying an actuating pawl 556. On the arm 555 is the pin 557, cooperation between the pin 557 and the cam lobe 553 causing the actuating pawl 556 to advance the ratchet 558 one tooth for each revolution of the shaft S.

The ratchet 558 (see Fig. 14) turns on the shaft 559 and is held against the reverse movement by the detent 560 mounted at 561 on the bracket 551 and held in contact with the ratchet 558 by the spring 562. The ratchet 558 drives the cam 563 on the same shaft, which cam is provided with a lobe 564 cooperating with the pin 565.

The lobe 564 through the pin 565 will advance the rack 545 to the position shown in Fig. 14 once for every twenty-five pads laid on the belt surface 540.

During this forward movement the shaft 542 will not turn and the belt 540 will remain stationary.

The clutch 566 (see Fig. 13) permits this movement to take place without movement of the shaft 542.

As soon as the pin 565 is passed over the lobe 564, the spring 548 will withdraw the rack 545 reversing the movement of the pinion 544. The leaf spring 567 meshing with the teeth of the toothed member or clutch 566 will assure that the pulley 541 will be moved and the belt 540 advanced upon reverse movement of the rack 545 from the position shown in Fig. 14 by the spring 458.

The shaft 542 (see Fig. 13) is provided with bearing blocks 568 fitting in the channel recesses 569 in the frame.

The bracket 570 extending upwardly from the frame member 570 carries the guide plates 571 and 572 which assure that the pad units upon being ejected from the table U by the rollers 529 to 532 after the printing operation will fall upon the belt 540.

It is thus apparent that the present invention provides the means for automatically counting the pads as they are manufactured by machine and advancing them by the carrier belt 540 in piles of a predetermined number to an attendant who may immediately package the pads or place them in a suitable container without the necessity of providing for a counting operation.

In the operation, as shown in Figs. 16, 17 and 18, it is frequently desirable to fold the wrapper and/or absorbent strips before they are fed to the cutting, feeding and sewing mechanisms and this is accomplished by the guide and folder constructions such as best shown in Figs. 16a to 16e for Fig. 16; Figs. 17a to 17c for Fig. 17 and Figs. 18a to 18d for Fig. 18.

The frame structure to carry out the folding operation is best shown in Figs. 16a, 16b, 16c and 18a.

Referring to Figs. 16a and 18a, the frame of the machine 29 carries forwardly extending angle beams 585 and 586. These angle beams being arranged in pairs as shown in Figs. 16a, 16b and 16c.

As shown best in Fig. 18a, a vertical member 587 is provided extending between the upper and lower beams 585, 586 provided with the horizontal pivot members 588 and 589 respectively for carrying rolls of foil and parchment 590 and 591.

At the front of the machine are the vertical members 592 and 593 (see Figs. 16b and 16c) which are attached, as indicated at 594 in Fig. 18a to the side members 585 and 586 and which in turn carry the transverse angle members 595, 596.

The extensions 597 and 598 of the members 585 and 586 carry the vertical pivot elements 599 and 600, said pivot rods directly carrying the holder plates 601 and 602 for carrying rolls of foil and parchment 603 and 604 respectively, as for the operation shown in Fig. 17a. The lower angles 604 and 605 act as stop members for the lower ends of the rods 599 and 600.

The vertical post 592 is also provided with an extension 607 which carries the horizontal pivot mounts 608 and 609 for the two flannel rolls 610 and 611 (see Fig. 18d) or for a single felt roll as may be desired.

As best indicated in Figs. 16a, 17a and 18a, one of the angle beam members 585 carries the support element 612 which is provided with a vertical support shaft 613 and a plate 614 for receiving a roll of flannel which is particularly realized in the folding operation of Figure 16.

The same beam 585 also carries the horizontal pivot axis 609 which is in part supported by the angle 607 for a roll of flannel or felt as shown in Figure 17a.

Referring now specifically to the set up shown in Figs. 16a to 16d, which is utilized in making the pad, as indicated in Fig. 16, with a double ply paper-foil wrapper sheet and a folded flannel absorbent sheet, the parchment foil is carried on a roll 580 supported on the pivot mount 588 and the wrapper strip may consist of foil alone or preferably a combined foil and paper which have been paraffined or waxed together. The paper is fed off the roll 590 through guide members 615 and 616 and then on to the recessed plate F on to the table U. The guides 615 and 616 each consist of two bars 617 and 618 which are supported by a back plate 619 attached to the frame of the machine by the angle 620.

The flannel is unreeled from a roll 621 on the plate 614 and is then passed over the guide 622 and from the guide 622 passes on to the folder 623.

The folder 623 which is shown in enlarged section in Fig. 16b is supported on the ear 624 which ear 624 carries the arm 625 fixed by the nut 626, said arm 625 carrying the plate 627 having the recess 628 and the side guide ridges 629.

The folded flannel absorbent strip B is caused to pass beneath the press plate 630 which is pressed down against the folded strip B by the leaf spring 631 which is bolted at 632 to the plate extension 633.

As indicated the arm 625 supports the frame member 634 which has two rods 635 supporting the plate 627. The flannel sheet after being folded passes on to the guide G (see also Fig. 1). Then, as the folded flannel sheet and the foil-paper combination are fed side by side into the machine, as indicated in Fig. 1, the flannel is first intermittently fed by the mutilated rollers I, is cut by the cutting device K and then is inserted below the continuously fed wrapper strip by the inserter device L with the opener M.

Referring to Figure 16e, the cut sections T of the absorbent pad pass over the table section 110 which is provided with a lip 636 turned from the table U and the inserter device L shown in Figure 1 will press the cut absorbent sections T into the groove 637 beneath said lip 636. As soon as this is done, the mutilated roller V will grasp the absorbent strip T and advance it with the constantly advancing wrapper strip A through the sewing machine through the main feed rolls H over the tension take-up N to the die cutter or straight cutter O of Figs. 9 to 11 or Figs. 9a to 10a, respectively.

In Figs. 17a, 17b, the foil is fed from the roll 603 and is folded in between the parchment paper which is fed from the roll 604. As shown in Figs. 17a, 17b and also Figure 16b, the foil and parchment are passed through the two guide spools 638 which are supported by the legs 639 on transverse member 595 of the folding mechanism.

As shown best in Fig. 17b, the foil C occupies one half the width of the parchment A and it is folded in by the folding device 623' which takes the same form and shape and structure as indicated in Figs. 16a and 16b, similarly functioning parts being indicated by the same numerals primed.

The single flannel or felt strip B is similarly guided by the devices 615' and 616' of similar construction to the corresponding elements shown in Fig. 16a, similarly functioning parts being indicated by the same numerals primed.

Referring to Fig. 17c, it will be noted that the folded wrapper strip A is separated by the flange or lip 636 so that the double flannel sections T will be inserted between the edges of the folded paper strip A.

In Figs. 17 to 17c, therefore, is shown the method by which a continuous roll of foil C may be folded in the continuous wrapper strip A and assembled with cut sections of two layers of flannel or one layer of felt.

It will be noted in Figs. 17 and 18, the cutting is done by a straight cutter as shown in Figs. 9a and 10a and not by the die cutter of Figs. 9 to 11.

In Figs. 18a and 18b, a foil having a wax paper back, as indicated at A, is fed over the guides $615^2$, $616^2$ having the same construction as shown in Fig. 16a, and a strip of felt B is fed from the roll 611 or two layers of flannel are fed from the rolls 610 and 611 through the other pair of guides $615^3$ and $616^3$ to the table of the machine.

The wax paper is separated from the foil by the heater device E, as shown in Fig. 18 and the section of felt as shown in Fig. 18b is inserted between the foil and the paper in which position it is clamped and then sewed in the normal operation of the machine as previously described.

It is to be understood, of course, that almost an infinite number of variations may be made in the method of folding and combining various materials either for the wrapper sections and/or for the absorbent sections and if desired, the structures G, I, K, L, V and M may be omitted or not used, and the absorbent sheet may then be fed directly under and together with the wrapper with the result that the wrapper sections and absorbent sections will be substantially cut to the same lengths the width of the absorbent sections being preferably a little less than that of the wrapper sections.

This latter is accomplished by feeding a narrower strip of flannel or felt as the case may be.

As shown, the speed of the feed rollers H may be varied by the gear arrangement W to feed the wrapper strip A at any desired rate relative to the absorbent strip B so that the absorbent sheet may be of desired width in respect to the wrapper sheet when the final pads are cut by the cutter device O.

The inserter device L might also be caused to insert foil sections C in between the folded wrapper strip A so that the foil section will be entirely enclosed by said folded strip, or such inserter device L may also be caused to insert flannel or felt sections T so that they will be entirely covered by the wrapper strip A in which case the intermittent feed rolls V will be placed over the wrapper strip A and assure advancement of the cut flannel or felt sections T with the wrapper strip to the sewing machine J.

The printing device Q, as stated before, may be utilized without ink solely to emboss or may be controlled to print without embossing or may be set to cause both printing and embossing of the wrapper section.

The drive may be had in various manners but preferably, a motor not shown is supported on the frame 29 and is connected by a belt to the pulley 650 fitting in the recess 651 in the base plate 31. (See Fig. 1.)

The pulley 650 connects the gear reduction 652 which actuates the shaft S and drives the various elements previously described in the proper time and synchronism in respect to each other to assure the manufacture of the pad according to the predetermined arrangement.

To briefly summarize from extreme right to extreme left in Fig. 1, the shaft is first connected to actuate the cutter device K by the cam and follower 85—86 then to drive the intermittent feed rolls I by the shaft 212 and also the intermittent clamping rolls V, through the gears 211, 210 and 209. Next, the shaft is connected by means of a cam 122 and follower 121 to actuate the inserter device L.

The gear reduction unit 652 is directly connected to operate the sewing machine J through the lever 235 and the shafts 242 and 243. Next the main shaft S is actuated to operate the main feed rollers H for the wrapper strip through the gearing 183, 186, 178, 171 and 165 to 167.

The shaft S is connected through the gearing 363 and 362 to turn the holding roller P and by the shaft 275 actuate the die cutter O through the eccentric arrangement 272. Alternately the cam 418 may be used to drive the straight cutter of Figs. 9a and 10a.

At this point, the shaft 361 actuated through the gears 364 and 365 drives the gear 479 connected to drive the printing roller mechanism, the printing rollers 440 and 441 being driven by the gear 480 and 482 and the removing rollers 529 to 532 being driven by the gear 536.

Finally, the shaft S actuates the cam 552 which operates the counting and conveying device R.

The shaft S is provided with the bearing supports 641 and 642 at the ends of the base plate 31 and with an intermediate bearing member 643.

A spring finger 644 may be attached at 645 on the inserter element L so as to catch and prevent excessive movement of the absorbent wrapper sections T when they are being advanced by the rollers I and before they are cut by the device K.

The inserter guide 636 of the structure M is provided with the opening 640 which will permit the separated edge portions of the multiple ply wrapper strip A to move beneath the table section 110 as indicated in Figures 16a, 17c and 18b.

As indicated upon Figure 1, the shafts 212, 176, 361 are respectively provided with bearing supports 647, 182 and 646 also positioned on the base plate 31.

In Figures 16 and 17, the various mechanisms F to R, are not shown in detail, but the position at which they are operated is indicated by these letters so that the operation will be more clearly illustrated in connection with the showing in Figure 1.

Referring to Figs. 16 and 17, it will be noted that after the cutter device K has cut the flannel strip B into short sections S, that the flannel is then inserted between the separated edges of the folded or multi-ply wrapper strip as indicated and then sewed into, folded by a continuous running stitch by the sewing machine J.

It is intended that all modifications and alterations as will come within purview of the present invention be included hereby and it is also to be understood that the specific structures shown and described are given merely by way of illustration and not by way of limitation.

What is claimed is:

1. The process of making sewn hair waving pad units from a continuous strip of absorbent material and a continuous strip of weak non-absorbent wrapper material, which comprises feeding the strips in substantial parallelism, then cutting the absorbent strip into pieces, then moving the pieces transversely to assemble them with the wrapper strip, then uniting the pieces and the wrapper strip together by sewing and then cutting the wrapper strip into pieces.

2. A process of making sewn hair waving pad units from a continuous strip of an absorbent material composed of a woven textile and a continuous strip of a relatively weak non-absorbent wrapper material, the area of the absorbent material, being less than the area of the wrapper material, which comprises feeding the strips in substantial parallelism, then cutting the absorbent strips into pieces, then moving the cut absorbent pieces transversely together with the continuous strip of wrapper material, then uniting the cut pieces of the absorbent strip with the wrapper strip by sewing along one edge of the wrapper strip and then cutting the wrapper strip into pieces at points between the attached pieces of absorbent strip.

3. The process of making sewn hair waving pad units for Croquignole and spiral hair waving from a continuous strip of an absorbent material composed of a woven textile and a continuous strip of a non-absorbent wrapper material selected from the group consisting of foil or paper which comprises feeding the strips in substantial parallelism, then cutting the absorbent strip into pieces, then moving the cut pieces of the absorbent strip into contact with the continuous wrapper strip transversely to assemble them with the wrapper strip, then uniting the cut pieces of the absorbent strip to the continuous wrapper strip by sewing and then cutting the wrapper strip into pieces at places between the attached pieces of the absorbent strip.

CURT J. ROHLAND.